United States Patent
Silverstein et al.

(10) Patent No.: US 10,745,893 B2
(45) Date of Patent: Aug. 18, 2020

(54) USER FRIENDLY SYSTEMS AND DEVICES FACILITATING WATER CONSERVATION IN THE SMART HOME

(71) Applicant: Google LLC, Mountain View, CA (US)

(72) Inventors: Brian Silverstein, Mountain View, CA (US); Lawrence Chang, Palo Alto, CA (US); Mary Reilly, Mountain View, CA (US); David Sloo, San Francisco, CA (US)

(73) Assignee: Google LLC, Mountain View, CA (US)

(*) Notice: Subject to any disclaimer, the term of this patent is extended or adjusted under 35 U.S.C. 154(b) by 23 days.

(21) Appl. No.: 15/654,000

(22) Filed: Jul. 19, 2017

(65) Prior Publication Data

US 2019/0024350 A1 Jan. 24, 2019

(51) Int. Cl.
| | |
|---|---|
| *E03B 7/07* | (2006.01) |
| *E03B 1/04* | (2006.01) |
| *E03C 1/05* | (2006.01) |
| *E03C 1/04* | (2006.01) |
| *H04L 12/28* | (2006.01) |
| *G05B 9/05* | (2006.01) |

(52) U.S. Cl.
CPC ............... *E03B 7/075* (2013.01); *E03B 1/04* (2013.01); *E03C 1/0408* (2013.01); *E03C 1/055* (2013.01); *G05B 9/05* (2013.01); *H04L 12/2816* (2013.01); *E03C 2001/0418* (2013.01); *G05B 2219/21156* (2013.01)

(58) Field of Classification Search
CPC .......... E03B 7/075; E03B 1/04; E03C 1/0408; E03C 1/055; E03C 2001/0418; H04L 12/2816; G01S 13/06; H04B 10/502; G05B 9/05; G05B 2219/21156
See application file for complete search history.

(56) References Cited

U.S. PATENT DOCUMENTS

| | | | | |
|---|---|---|---|---|
| 5,868,311 | A * | 2/1999 | Cretu-Petra | E03C 1/057 236/12.12 |
| 2004/0061598 | A1* | 4/2004 | King | B60R 21/013 340/435 |
| 2011/0042470 | A1* | 2/2011 | Deivasigamani | G05D 23/1909 236/51 |
| 2011/0179387 | A1* | 7/2011 | Shaffer | G06F 3/04883 715/835 |
| 2015/0023562 | A1* | 1/2015 | Moshfeghi | G01S 5/0263 382/106 |
| 2016/0028872 | A1* | 1/2016 | Ripp | H04M 1/72525 455/418 |
| 2016/0129464 | A1* | 5/2016 | Frommer | B05B 12/008 700/282 |

(Continued)

*Primary Examiner* — Christopher E. Everett
(74) *Attorney, Agent, or Firm* — Kilpatrick Townsend & Stockton LLP

(57) ABSTRACT

Systems and methods for facilitating water conservation and smart water control are provided. Water conservation and smart water control can be achieved using a smart water apparatus having the ability to approximate distance, mass, and/or specific characteristics of an object such as a human or inanimate object and adjust flow rate of water and/or temperature of the water based on the approximated distance, mass, and/or specific characteristics of an object. The smart water apparatus can be embodied, for example, in a network connected shower head or a network connected faucet.

20 Claims, 15 Drawing Sheets

(56) References Cited

U.S. PATENT DOCUMENTS

| | | | |
|---|---|---|---|
| 2016/0258144 A1* | 9/2016 | Tayenaka | E03C 1/025 |
| 2017/0050201 A1* | 2/2017 | Deivasigamani | B05B 12/122 |
| 2018/0148912 A1* | 5/2018 | Park | E03C 1/05 |
| 2018/0263834 A1* | 9/2018 | Ryberg | A61G 7/1003 |

* cited by examiner

USER FRIENDLY SYSTEMS AND DEVICES FACILITATING WATER CONSERVATION IN THE SMART HOME

TECHNICAL FIELD

This patent specification relates to systems and methods for facilitating water conservation in the smart home. More particularly, this patent specification relates to systems and methods for managing use of water using detection circuitry.

BACKGROUND

Water dispensing devices are commonly used in residential and commercial structures to provide water for a desired purpose. For example, home residents may use a shower to bathe and use a faucet to wash their hands, brush their teeth, or do dishes. However, there are many instances in which the use of water is wasteful. For example, a user may turn on a shower to achieve a desired water temperature, but may not enter the shower once it reaches that temperature, thereby resulting in inefficient use of the shower. Accordingly, systems and methods for facilitating water conservation are needed.

SUMMARY

Systems and methods for facilitating water conservation and smart water control are provided. Water conservation and smart water control can be achieved using a smart water apparatus having the ability to approximate distance, mass, and/or specific characteristics of an object such as a human or inanimate object and adjust flow rate of water and/or temperature of the water based on the approximated distance, mass, and/or specific characteristics of an object. The smart water apparatus can be embodied, for example, in a network connected shower head or a network connected faucet.

In one embodiment, a smart water apparatus is provide. The smart water apparatus can include a water source port, a water egress port, flow control valve operative to control flow of water received at the water source port and ejected through the water egress port, radio frequency (RF) ranging circuitry operative to approximate a distance of an object from the smart water apparatus, and control circuitry coupled to the flow control valve and the RF ranging circuitry. The control circuitry is operative to adjust the flow of water being ejected through the water egress port based on the approximated distance between the object and the smart water apparatus.

In another embodiment, a smart water apparatus is provide that can include a water source port, a water egress port, flow control valve operative to control flow of water received at the water source port and ejected through the water egress port, a temperature sensor operative to monitor a water temperature of water flowing through the smart water apparatus, communications circuitry operative to communicate with remote circuitry that is coupled to a water temperature control assembly, radio frequency (RF) capturing circuitry operative to approximate mass of an object and distance of the object from the smart water apparatus, and control circuitry coupled to the temperature sensor, wireless circuitry, flow control valve, and the RF capturing circuitry. The control circuitry is operative to adjust the flow of water, via the flow control valve, being ejected through the water egress port based on the approximated distance, and adjust the temperature of the water, via the communications circuitry, based on the approximated mass of the object.

In yet another embodiment, a method for operating a smart water apparatus is provided that uses radio frequency (RF) capturing circuitry to approximate a distance of an object from a fixed point of reference, and adjusts a flow rate of water exiting the smart water apparatus based on the approximated distance, wherein the flow rate comprises a zero flow, a maximum flow rate, and at least one intermediate flow rate existing between the zero and maximum flow rates A further understanding of the nature and advantages of the embodiments discussed herein may be realized by reference to the remaining portions of the specification and the drawings.

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more smart water apparatus embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

Figure 1:
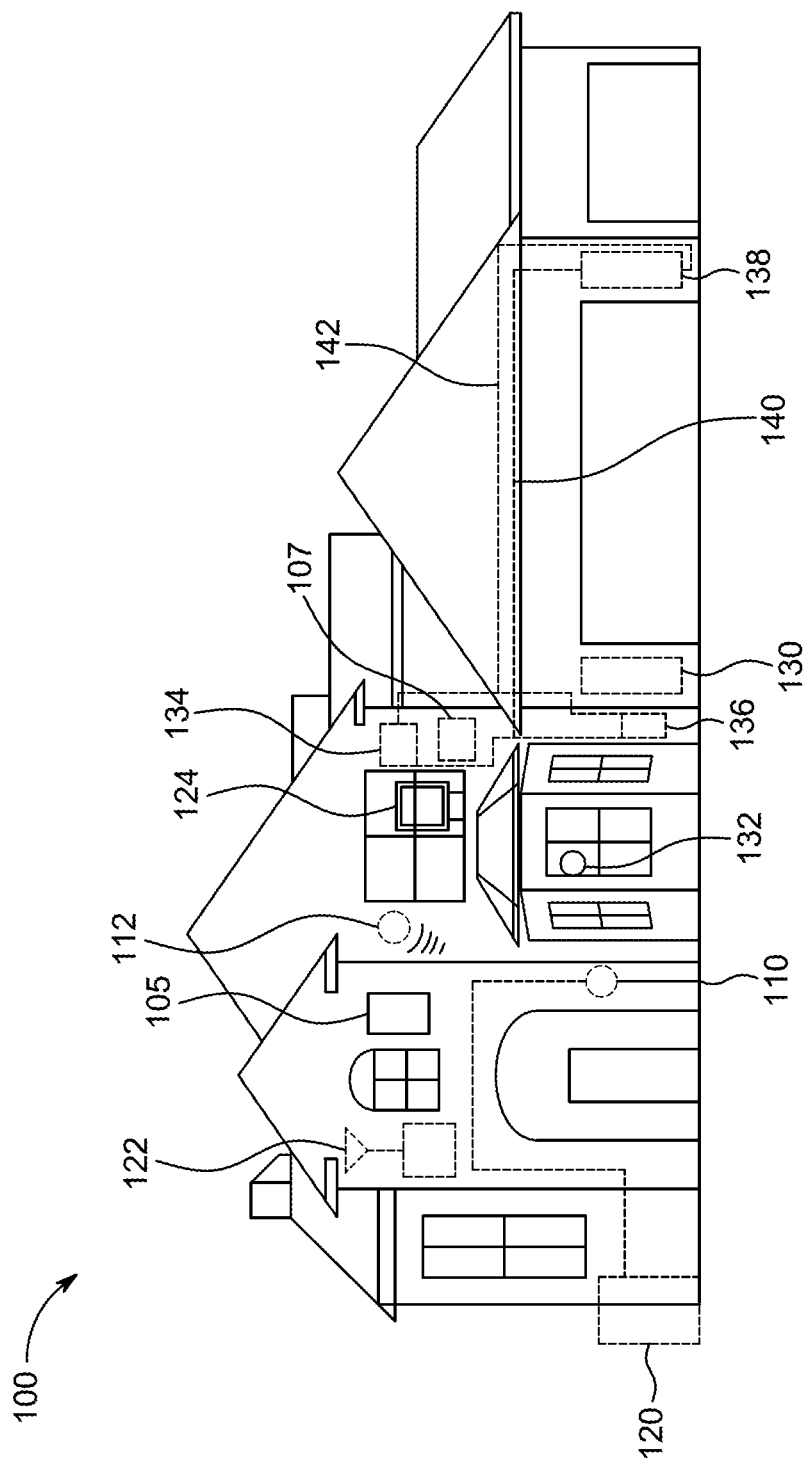
FIG. 1 is a diagram of an enclosure with a smart water system, according to some embodiments.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, central panel 130, camera 132, smart water apparatus 134, smart water apparatus 136, water heater 138, hot water pipe 140, and cold water pipe 142 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following components: low power wireless personal area network (LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), radar, and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, carbon dioxide, radon, and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure, including the communication of software updates between hazard detection systems), visual safety indicators (e.g., display of a green light indicates it is safe and display of a red light indicates danger), tactile and non-tactile input command processing, and software updates.

It should be understood that hazard detection system 105 may be implemented as a smart home device. Thus, although the discussion of the hazard detection system is described primarily with reference to specific hazards (e.g., smoke, CO, heat), the hazard detection system may provide additional features and functionality unrelated to those hazards. For example, the hazard detection system may monitor many different conditions. These conditions can include motions, sounds, and smells. These conditions can also include data supplied by remote sensors (e.g., armbands, door sensors, window sensors, personal media devices).

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link.

Camera 132 may be one of several cameras contained within enclosure 100 and may communicate with router 122 and/or central panel 130. Although several instances of camera 132 can be located in various places in the enclosure 100, it is generally the case that there will be no video or photographic cameras placed in the bathrooms. This restriction is in keeping with customary privacy practices found in most societies, and also in keeping with privacy laws that may exist in certain jurisdictions. One benefit provided by one or more of the described embodiments is the maintenance of privacy (in the form of no photos or videos) while at the same time providing practical benefits based on knowledge of user location, movement, or body position as obtained by non-photographic, non-video-based sensing. It is to be appreciated, however, that the presence of a camera in the bathroom may be consistent with one or more embodiments in certain situations, properly safeguarded, where such monitoring might be necessary, such as with intensive care of the very old, the physically recuperating, and/or the very young where physical safety is of utmost importance. Camera 132 may include a video camera, an infrared camera, and a motion sensor.

Smart water apparatuses 134 and 136 may be connected to hot water pipes 140 and cold water pipes 142. Any number of smart water apparatuses may be contained in enclosure 100. Hot water pipes may be connected to hot water heater 138, which may be any suitable heater such as a tank-based water heater or a tankless water heater. Smart water apparatuses 134 and 136 enable smart water conservation and further enable smart user interaction according to various embodiments discussed herein. Smart water apparatuses 134 and 136 may communicate with router 122, central panel 130, and/or a localized control panel (not shown).

Central panel 130 can be part of a security system or other master control system of enclosure 100. For example, central panel 130 may be a security system that may monitor windows and doors for break-ins, and monitor data provided by motion sensors and cameras such as camera 132. In some embodiments, central panel 130 can also communicate with one or more of thermostats 110 and 112, hazard detection systems 105 and 107, and smart water apparatuses 134 and 136. Central panel 130 may perform these communications via wired link, wireless link, or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition. As another example, central panel 130 can monitor which occupant is entering a bathroom and can communicate that information to one or more smart water apparatuses contained in that bathroom. This enables the smart water apparatus to have knowledge of water usage preferences (e.g., desired water temperature, shower schedule, etc.) of that occupant.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, central panel 130, camera 132, and water apparatuses 134 and 136. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105, thermostat 110, camera 132, or apparatus 134 to communicate with a device or server remote to enclosure 100. The remote server or remote device can host an account management program that manages various networked devices contained within enclosure 100. For example, in the context of smart water fixtures according to embodiments discussed herein, apparatus 134 can periodically upload data to the remote server via router 122. Similarly, apparatus 134 can receive data (e.g., commands or software updates) from an account management program via router 122.

Figure 2:
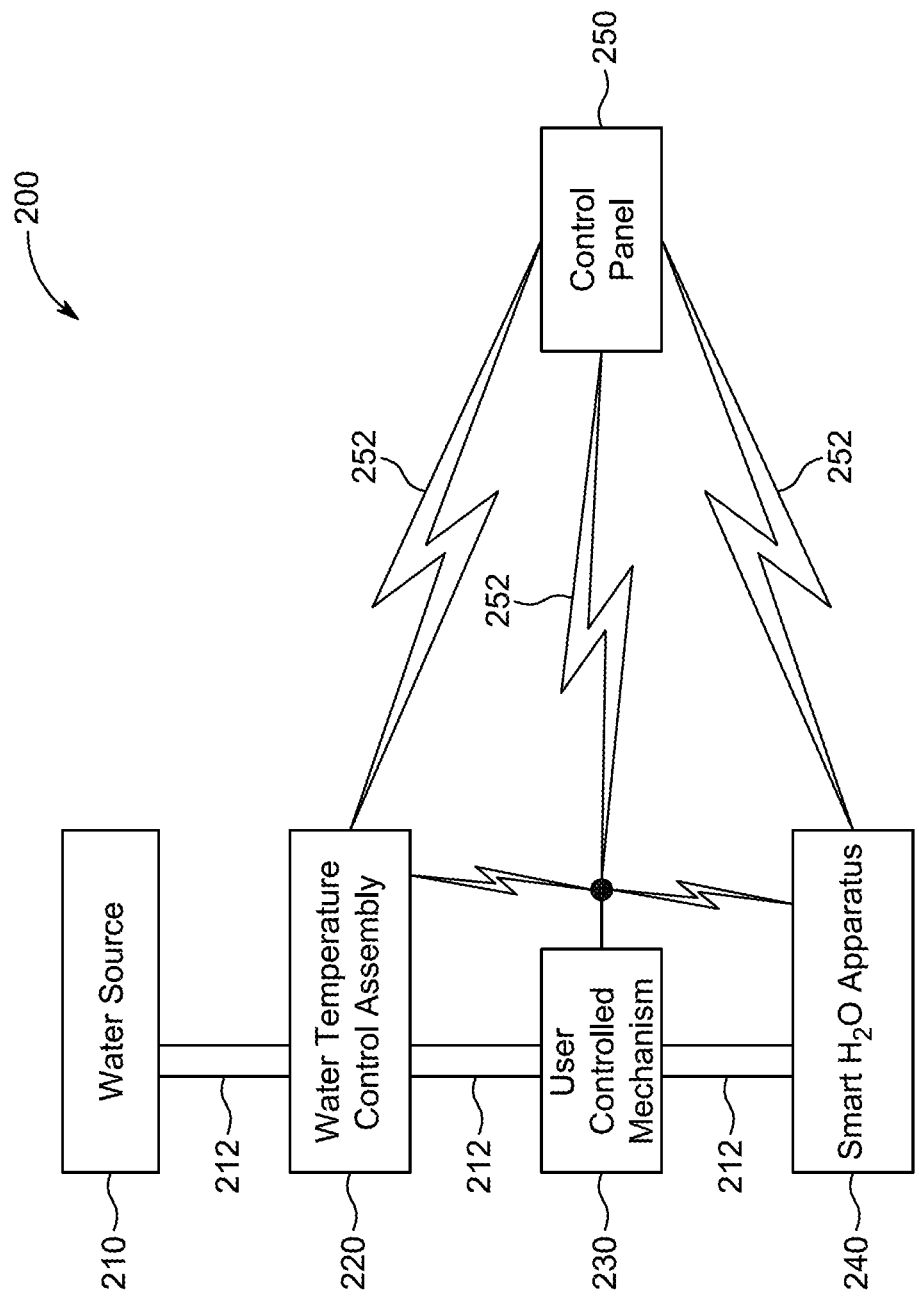
FIG. 2 shows an illustrative block diagram of water system, according to some embodiments.

FIG. 2 shows an illustrative block diagram of water system 200 according to an embodiment. Water system 200 can include water source 210, water temperature control assembly 220, user controlled mechanism 230, smart water apparatus 240, and control panel 250. Water may flow from water source 210 through assembly 220 and optionally through mechanism 230 and out of apparatus 240 via pathway 212. Water source 210 may represent the hot and cold water sources. Assembly 220 may control mixture and flow of both the hot and cold water sources to provide a mixed water temperature at a desire flow. Mechanism 230 may be a user controlled mechanism that controls assembly 220 to produce the desired temperature and flow rate. For example, in one embodiment, mechanism 230 may be a lever that can be rotated to control assembly 220. In another embodiment, mechanism 230 can include two rotatable knobs (e.g., one for cold water and another for hot water) and an optional lever to engage the shower. In yet another embodiment, mechanism 230 can be an ON/OFF lever or switch. When switched ON, assembly 220 may be controlled to provide water at a desired temperature and flow rate. When switched OFF, no water may be permitted to flow out of assembly 220 and apparatus 240.

Control panel 250 may be an optional component of system 200 and may be operative to provide, receive, or relay commands to/from assembly 220, mechanism 230, and apparatus 240 via wired or wireless pathways 252. In one embodiment, control panel 250 may be a user interface that permits a user to set a desired water temperature, define a shower schedule, which can include start and end times, flow rate, and temperature change throughout the duration of the shower.

Figure 3:
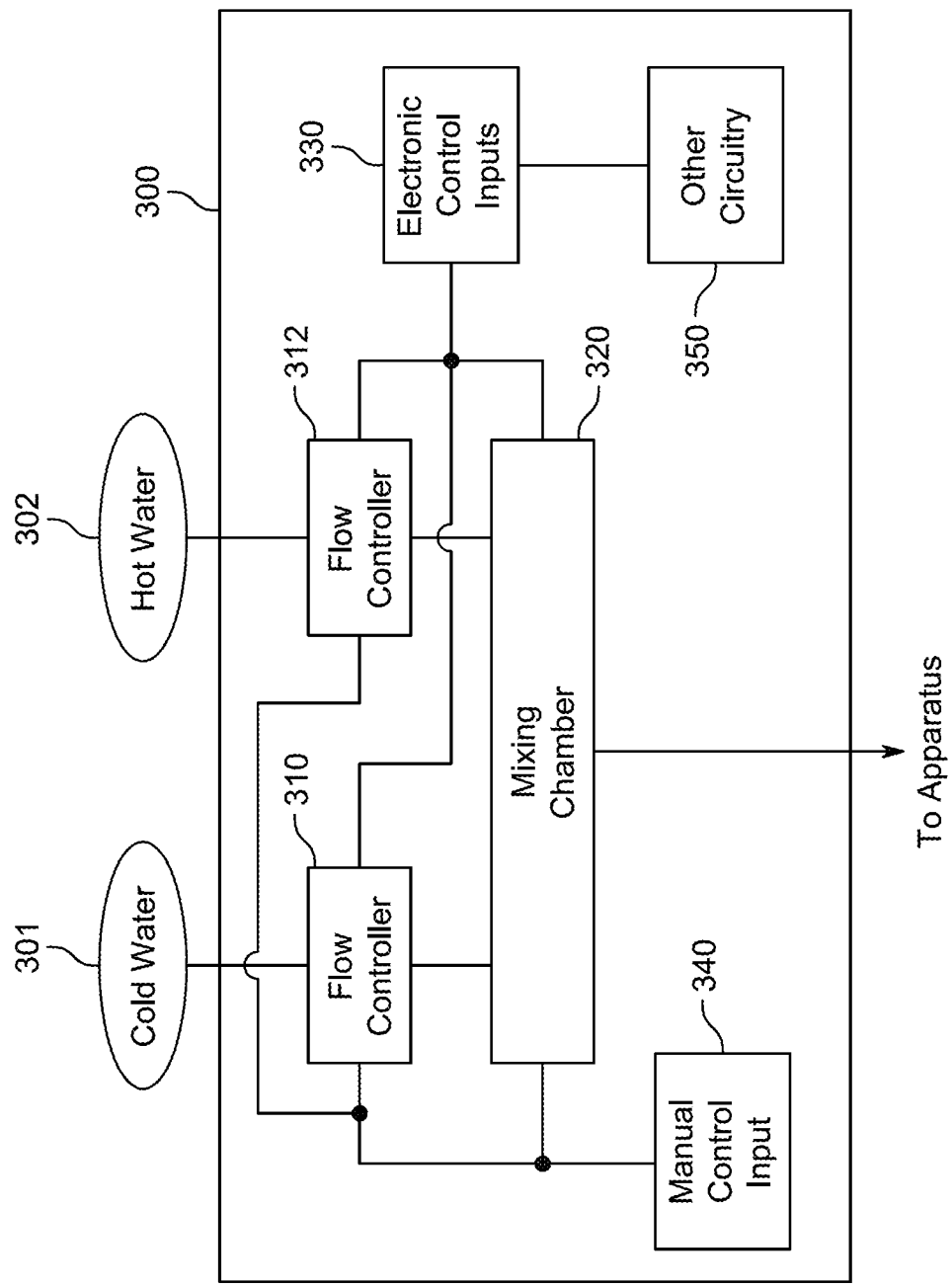
FIG. 3 shows an illustrative block diagram of water temperature control assembly, according to some embodiments.

FIG. 3 shows an illustrative block diagram of water temperature control assembly 300 according to an embodiment. The purpose of assembly 300 may be to control the flow rate of water from the water source to the smart water apparatus and to control the temperature of the water being provided to the smart water apparatus. Assembly 300 can be connected to receive cold water 301 and hot water 302 and connected to provide temperature and flow rate controlled water to an apparatus according to an embodiment discussed herein. Assembly 300 can include flow controllers 310 and 312, mixing chamber 320, electronic control inputs 330, manual control input 340, and other circuitry 350. Flow controller 310 can control flow rate of cold water entering mixing chamber 320 and flow controller 312 can control flow rate of hot water entering mixing chamber 320. The flow rate can vary between a zero flow rate and a maximum flow rate and, depending on design and capabilities of the flow controller, the flow rate can be adjusted to one or more different flow rates between the zero and maximum flow rates. Mixing chamber 320 may be designed to mix hot and cold water.

In some embodiments, flow controllers 310 and 312 can be electronically controlled via electronic control inputs 330. That is, electronic signals provided by inputs 330 can control an electromechanical valve mechanism that adjusts the flow rate of water through flow controllers 310 and 312. For example, electronic control inputs 330 can be derived from a smart water apparatus (e.g., apparatus 240), control panel (e.g., control panel 250), control mechanism (e.g., mechanism 230), a smart phone (not shown), or a wireless router (not shown). Other circuitry 350 may represent any other circuitry and components needed to enable operation of flow controller 310 and 312. Examples of other circuitry can include a power source, control circuitry, and communications circuitry.

In some embodiments, flow controllers 310 and 312 can be manually controlled via manual control input 340. That is, a physical movement may be responsible for controlling a valve mechanism that adjusts the flow rate of water. Manual control inputs can be derived from one or more levers or knobs. In some embodiments, the manual control can override any electronic control to adjust the flow rate of water. For example, manual control can be used to turn the flow of water ON and OFF, but the electronic control can be used to control water temperature and to temporarily cease flow of water.

It should be appreciated that different variations of flow controllers 310 and 312 and mixing chamber 320 may be used and that the example provided in FIG. 3 is merely illustrative. For example, the flow controllers can be integrated into the mixing chamber to provide a single integrated component. As another example, a single flow controller can be connected to both water sources and the mixing chamber can be omitted.

Figure 4:
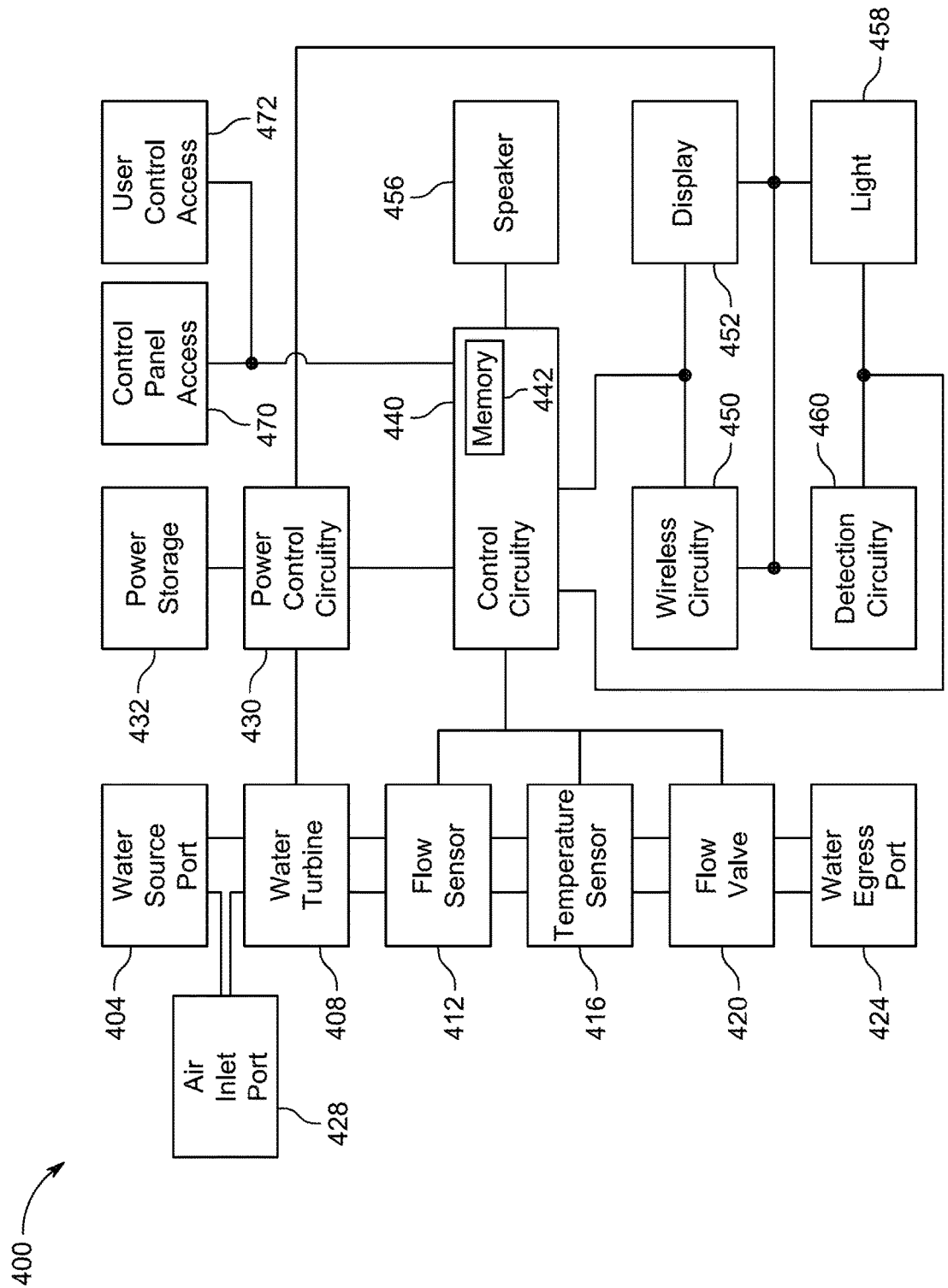
FIG. 4 shows an illustrative block diagram of smart water apparatus, according to some embodiments.

FIG. 4 shows an illustrative block diagram of smart water apparatus 400 according to an embodiment. Apparatus 400 can include water source port 404, water turbine 408, flow sensor 412, temperature sensor 416, flow valve 420, water egress port 424, and air inlet port 428.

Apparatus 400 may also include power control circuitry 430, power storage 432, control circuitry 440, memory 442, wireless circuitry 450, display 452, speaker 456, light 458, detection circuitry 460, control panel access 470, and water control access 472. Water is received at water source port 404 and ejected out of water egress port 424. The path through which the water flows from port 404 to port 424 may be referred to herein as the water path or water pathway. The water pathway can include one or more of water turbine 408, flow sensor 412, temperature sensor 416, flow valve 420. The arrangement of water turbine 408, flow sensor 412, temperature sensor 416, flow valve 420 can take any suitable order so long as they exist between ports 404 and 424.

Water turbine 408 is operative to generate power when water is flowing through it. As water passes through the water pathway, it drives a turbine, which in turn drives a generator. As the generator turns, power is produced and may be provided to power control circuitry 430. Power control circuitry 430 can manage the power supplied by water turbine 408 and use it to recharge a battery in power storage 432 and provide power to other components in apparatus 400, including, for example, flow sensor 412, temperature sensor 416, flow valve 420, control circuitry 440, memory 442, wireless circuitry 450, display 452, speaker 456, light 458, detection circuitry 460, and any other circuitry.

Flow sensor 412 may measure the flow rate of water moving through the water pathway. Temperature sensor 416 may measure the temperature of the water moving through the water pathway. Flow valve 420 may be operative to fully shut off of the flow of water through the water pathway to prevent water from exiting port 424. In one embodiment, the operation of flow valve 420 may be binary in that it may be fully open (e.g., resulting in a maximum flow rate) or fully closed (e.g., resulting in a zero flow rate). In another embodiment, flow valve may be able to adjust the flow rate to at least one flow rate between the zero and maximum flow rates.

Air inlet port 428 may permit air to be injected at any location within the water pathway. For example, air inlet port 428 may be integrated with water egress port 424. In some embodiments, air inlet port 428 may form part of a venturi chamber, which mixes water and air to produce the perceived effect of stronger water flow with use of less water. In some embodiments, multiple air inlet ports may be used to introduce air into the water.

Control circuitry 440 can be operative to handle smart operations concerning the passage of water through apparatus 400. Control circuitry 440 can include a processor (not shown) and memory 442. Control circuitry 440 may control operation of apparatus 400 based on instructions received via wireless circuitry 450, control panel access 470, and user controlled access 472 (e.g., for receiving instructions from mechanism 230), and based on data obtained from flow sensor 412, temperature sensor 414, and detection circuitry 460. Memory 442 may include volatile and non-volatile memory. Memory 440 can contain the software that is executed by the processor. In some embodiments, the software may be updated via software updates when wireless circuitry 450 communicates with a remote server. Control circuitry 440 can perform higher-level, advanced functions that may not have been conventionally associated with water dispensing fixtures. For example, control circuitry 440 may enable more advanced user interface and communications functions. Circuitry 440 may use various computationally-intensive algorithms to sense patterns in user behavior, to discern whether the user is present, discern whether the user is using both hands, just one hand, the entire body, a toothbrush or a razor. Circuitry 440 may run algorithms for governing, for example, the color gradient of light 458 as a function of water temperature, water usage, or time remaining for a shower. Circuitry 440 may run algorithms for governing, for example, the content presented on a display. Circuitry 440 may run algorithms for governing, for example, the issuance of voice commands to users. Circuitry 440 may runs algorithms for uploading logged data to a central server, for establishing network membership, and for facilitating updates to the programmed functionality of one or more elements of the water apparatus 400. While control circuitry 440 is configured and programmed to provide many different capabilities for making water apparatus 400 an appealing, desirable, updatable, easy-to-use, intelligent, network-connected sensing and communications node for enhancing the smart-home environment, its functionalities are advantageously provided in the sense of an overlay or adjunct to the core operation of the water apparatus, such that even in the event there are operational issues or problems with control circuitry 440 and its advanced functionalities, the underlying purpose and functionality of water apparatus 400 will permit water to flow, with or without control circuitry 440 and its advanced functionalities.

Communications circuitry 450 can include a Wi-Fi module capable of communicating according to any of the 802.11 protocols, a low power Wireless Personal Area Network (6LoWPAN) module or a ZigBee module capable of communicating according to a 802.15.4 protocol, Bluetooth Low Energy (BLE), or any combination thereof. Depending on an operating mode of apparatus 400, circuitry 450 can operate in a low power "sleep" state or a high power "active" state. For example, when apparatus 400 is in a low power mode, BLE circuitry or 802.15.4 circuitry may periodically turn on to check whether another device is attempting to communicate with apparatus 400. When apparatus 400 is in high power mode, each of the wireless communication circuitries (e.g., one or more of the 802.11 circuitry, 802.15.4 circuitry, and BLE circuitry) may be active.

Memory 442 can be any suitable permanent memory storage such as, for example, NAND Flash, a hard disk drive, NOR, ROM, or phase change memory. Memory can also include any suitable volatile memory such as RAM, DRAM, or SDRAM. In one embodiment, memory 442 can store audio clips that can be played back by speaker 456. The audio clips can include installation instructions or warnings in one or more languages. Speaker 456 can be any suitable speaker operable to playback sounds or audio files. Speaker 456 can include an amplifier (not shown).

Display 452 may be any suitable display capable of information pertinent to the operation of apparatus 400. For example, display may be a liquid crystal display, a light emitting diode (LED) display, an organic light emitting diode (OLED) display. Display 452 may include a touch screen that enables the user to interact with content of the display. In some embodiments, other input elements such as buttons (e.g., mechanical buttons or capacitive buttons) may exist on apparatus 400 to permit interaction with a user interface of apparatus 400. For example, buttons may be provided to adjust the water temperature and/or flow rate.

Figure 7A:
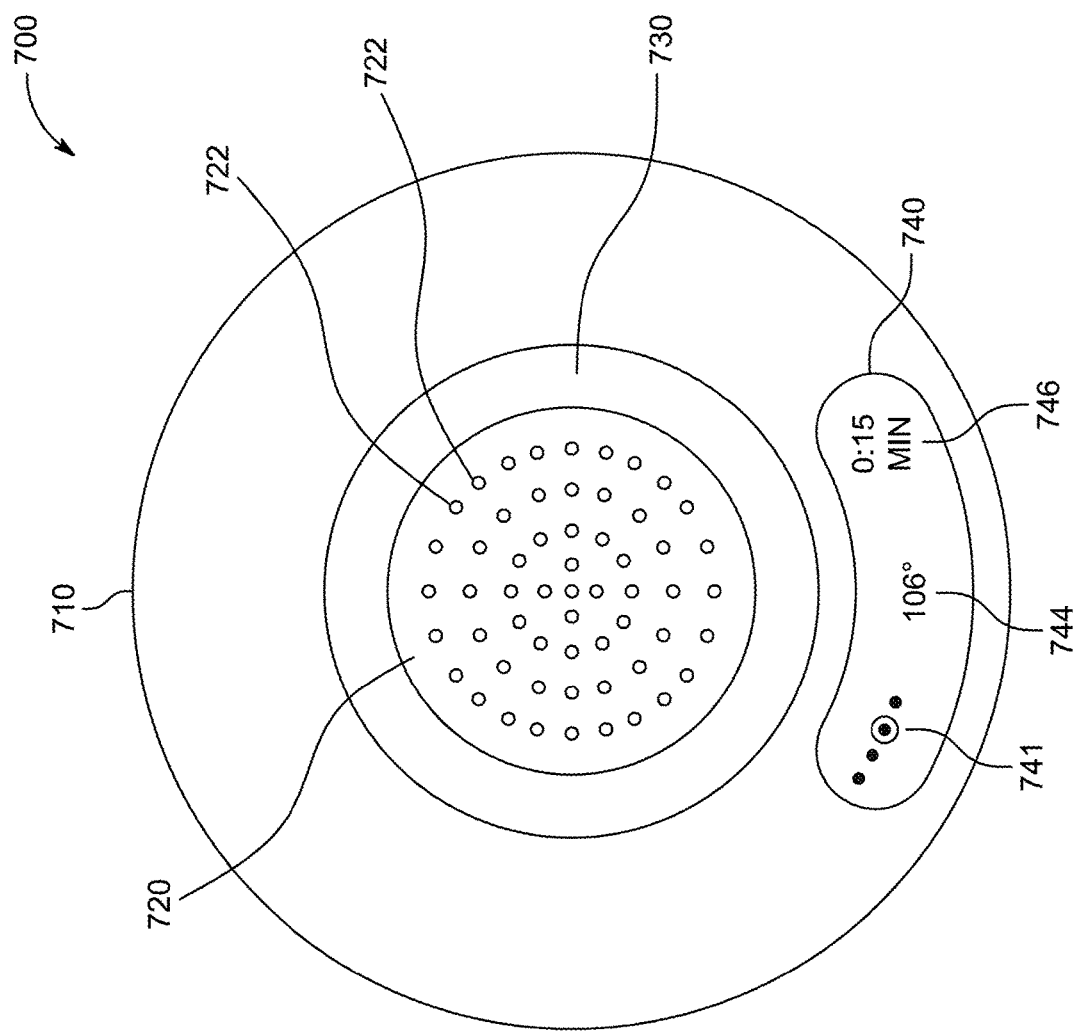
FIGS. 7A and 7B show illustrative front and side views of a smart water apparatus, according to some embodiments.
Figure 7B:
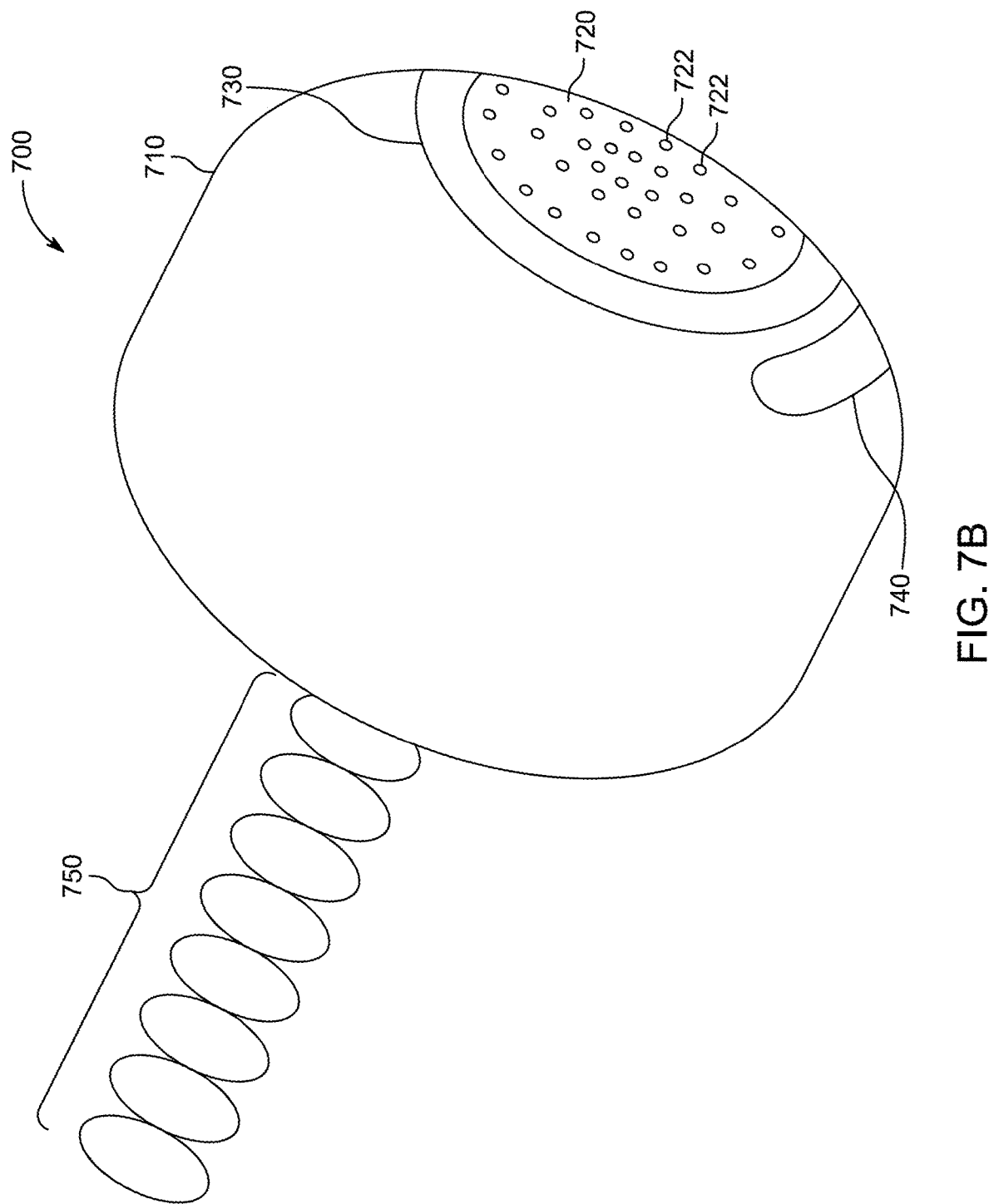

Light 458 may be any suitable light display arranged on the apparatus to convey information related to the operation of apparatus 400. For example, light 458 may be configured as a halo ring of LEDs that can change color. As a specific example, light 458 may be disposed around water egress port 424 (as illustrated in FIGS. 7A and 7B). Light 458 may change color to reflect the temperature of the water passing through apparatus 400. For example, light 458 can emit shades of blue light when the water is relatively cold, shades of yellow when the water is warm, and shades of red when the water is relatively hot. In another embodiment, light 458 can display different colors to signify a schedule associated with a water usage event (e.g., shower, hand washing, tooth brushing, etc.). For example, light 458 may shine a green color to indicate that the water usage event is ready to commence, and as time progresses, light 458 may change from green to yellow and eventually to red to signify that the water usage event should end or that available hot water is about to run out.

Detection circuitry 460 can include circuitry capable of detecting the presence of an object within the vicinity of apparatus 400. For example, detection circuitry 460 can include a motion detector that uses passive infrared or active infrared to detect motion. Detection circuitry 460 can include an infrared camera or thermal imaging camera. An infrared or thermal imaging camera may be desirable compared to a conventional camera to preserve privacy. Detection circuitry 460 can include ultrasonic circuitry that uses ultrasonic sensors to detect the presence of an object. Such sensors can generate high frequency sound waves and determine which wave(s) are received back by the sensor.

Detection circuitry 460 can include radio frequency (RF) ranging circuitry such as radar. The radar can be one-dimensional radar, two-dimensional radar, or three-dimensional radar. Any suitable radar array may be used. For example, a radar system may use X number of transmission antennas and Y number of reception antennas, where X and Y are integers. The radar can include ultra-wide band, 24 GHz, 77 GHz, and other suitable spectrums. The radar can be a Doppler radar or a pulse-Doppler radar. A pulse-Doppler radar is a radar that determines the range to a target using pulse-timing techniques, and uses the Doppler effect of the returned signal to determine the target object's velocity. The radar can be a continuous-wave radar in which a known stable frequency continuous-wave radio energy is transmitted and then received from any reflecting objects. The radar may use pulse compression, which is a signal processing technique used to increase the range resolution and signal to noise ratio Detection circuitry 460 can use a radio frequency (RF) capture system that captures the human figure (e.g., a coarse skeleton) or inanimate objects (e.g., toothbrush, razor, dishes, etc.). In one embodiment, the RF capture system can track the position of a person's limbs and body parts without the use of markers or sensors on the subject person. RF-capture may use two algorithmic components: a first component is a coarse-to-fine algorithm that efficiently scans 3D space looking for RF reflections of various human limbs and generating 3D snapshots of those reflections. The second component can exploit the fact that due to human motion, consecutive RF snapshots tend to expose different body parts and diverse perspectives of the same body part. Thus, this component can identify human body parts from RF snapshots across time, and can stitch multiple snapshots together to capture the human figure. In other embodiments, the same or similar algorithms can be used to identify inanimate objects.

Detection circuitry 460 can use other RF technology such as WiFi radios, Bluetooth radios such Bluetooth Low Energy (BLE), and 802.15.4 radios to detect objects. In some embodiments, the data collected from these other RF technologies can be processed with machine learning algorithms to infer quantifiable qualities such as presence.

An advantage of the radar systems is that they can still detect the human figure or parts thereof, and inanimate objects even if an object (e.g., a housing of the apparatus) occludes the RF signal emitted by the radar system. Thus, the radar system can be positioned behind a wall or a curtain, or integrated within a cosmetically pleasing housing, and still be able to detect the occupant. In contrast, a camera place behind a wall or curtain is effectively useless in detecting the occupant. Moreover, using radar in lieu of any camera based system ensures privacy is preserved.

The radar based systems that can be used as detection circuitry 460 can ascertain (1) ranging information of an object or objects from apparatus 400, (2) mass information of an object or objects within a vicinity of apparatus 400, and (3) unique characteristics information of an object or objects within a vicinity of apparatus 400. The ranging information can be used to determine how far an object is from apparatus 400 (or some other fixed point of reference). For example, apparatus 400 can vary the flow rate of water passing through the water pathway based on the range of the object. The mass information can be used to determine a quantity of mass of one or more objects. For example, in a shower context of apparatus 400, an arm may have a first mass quantity associated with it, and a corresponding water flow rate and/or temperature, whereas a body may have a second mass quantity associated with it, and a corresponding water flow rate and/or temperature. The second mass quantity is greater than the first mass quantity and thus may result in a greater flow rate of water. As another example, in the sink faucet context, two hands moving towards each other, but not touching may have a first mass quantity, and two hands rubbing against each other may have a second mass quantity. The first mass quantity may command a first flow rate and the second mass quantity may command a second flow rate, which is faster than the first flow rate. The unique characteristics information may enable detection circuitry 460 to differentiate between various objects such as a hand, a cup, a toothbrush, or a razor. For example, if a razor is detected, apparatus 400 may emit hot water, whereas if a toothbrush or cup is detected, apparatus 400 may emit cold water. Control circuitry 440 can use the ranging information, mass information, unique characteristics information, or any combination thereof, or any other data acquired by detection circuitry 460 to control operation of apparatus 400.

Control panel access 470 may be an electrical access port in which a control panel (e.g., control panel 250) can communicate with control circuitry 440. Control panel access 470 may be used in applications where a user interacts with a control panel to set parameters that can be controlled by apparatus 400 and water temperature control assembly 220. User control access 472 may be another electrical access port in which a water control mechanism (e.g., mechanism 230) can communicate with control circuitry 440. User control access 472 may be used in applications in which a user can press a ON/OFF button (as opposed to manipulating one or more levers or knobs) to start flow of water through apparatus 400.

Figure 5:
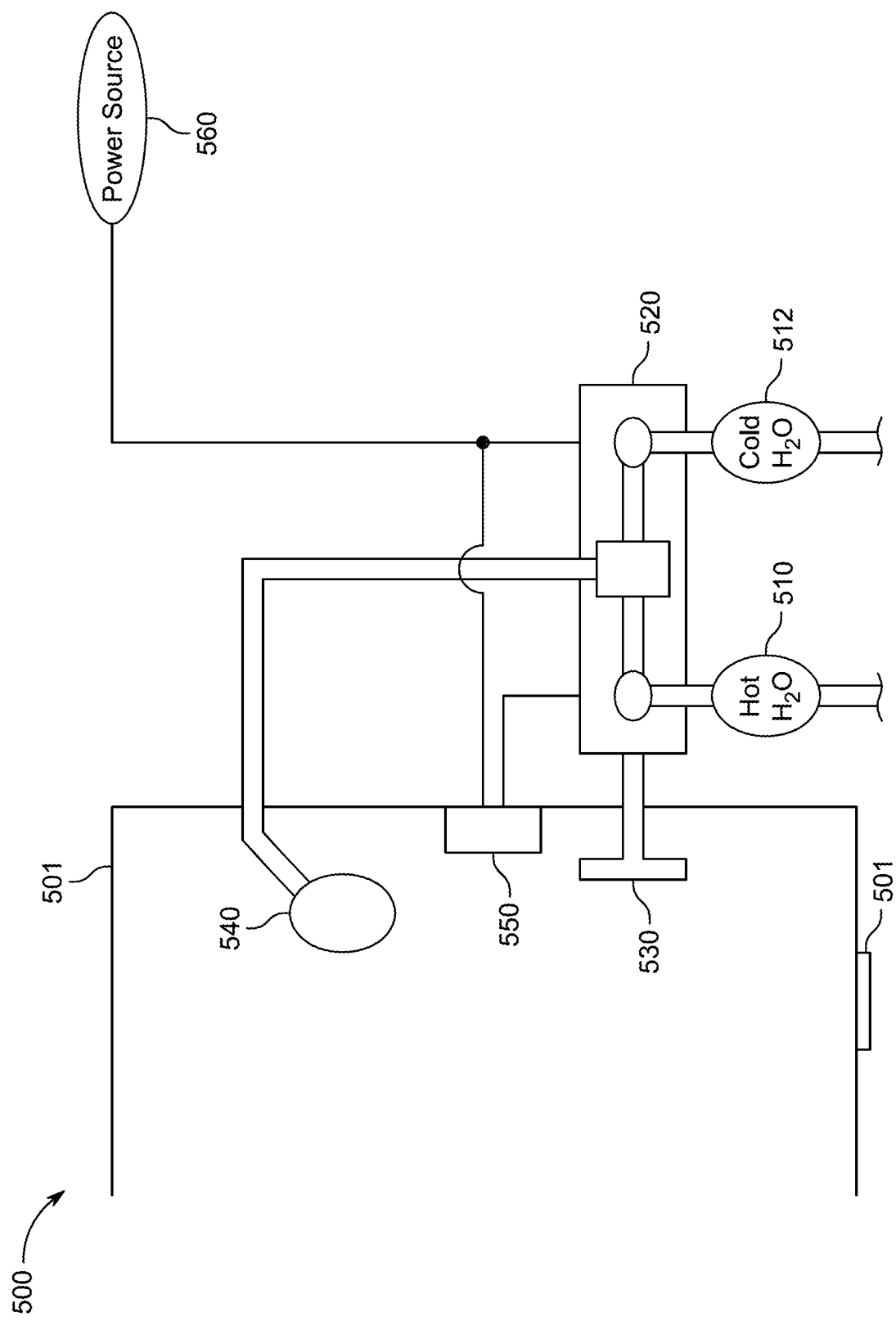
FIG. 5 shows an illustrative schematic of a shower that uses a water temperature control assembly and smart water apparatus, according to some embodiments.

FIG. 5 shows an illustrative schematic of a shower 500 that uses a water temperature control assembly and smart water apparatus according to an embodiment. Shower stall 501 is shown with drain 502, smart water apparatus 540, control panel 550, and water control mechanism 530 located within view of a user. Hot and cold water sources 510 and 512, water temperature control assembly 520, and power source 560 are located out of view of a user (e.g., behind the shower wall). Smart water apparatus 540 may embody the elements of apparatus 400 (discussed above) and water temperature control assembly 520 may embody elements of control assembly 300 of FIG. 3 (discussed above). A user may start a shower by interacting with mechanism 530 (e.g., by turning a dial or pressing a button) or control panel 550. Once the shower is started, smart water apparatus 540 may take over control of the shower. For example, apparatus 540 may exercise control by instructing assembly 520 to adjust water temperature and/or flow rate. Apparatus 540, itself, may control rate via its own flow valve (e.g., flow valve 420). In addition, apparatus 540 may provide information to the user in the form of a display, light, and/or messages played back through a speaker.

Figure 6:
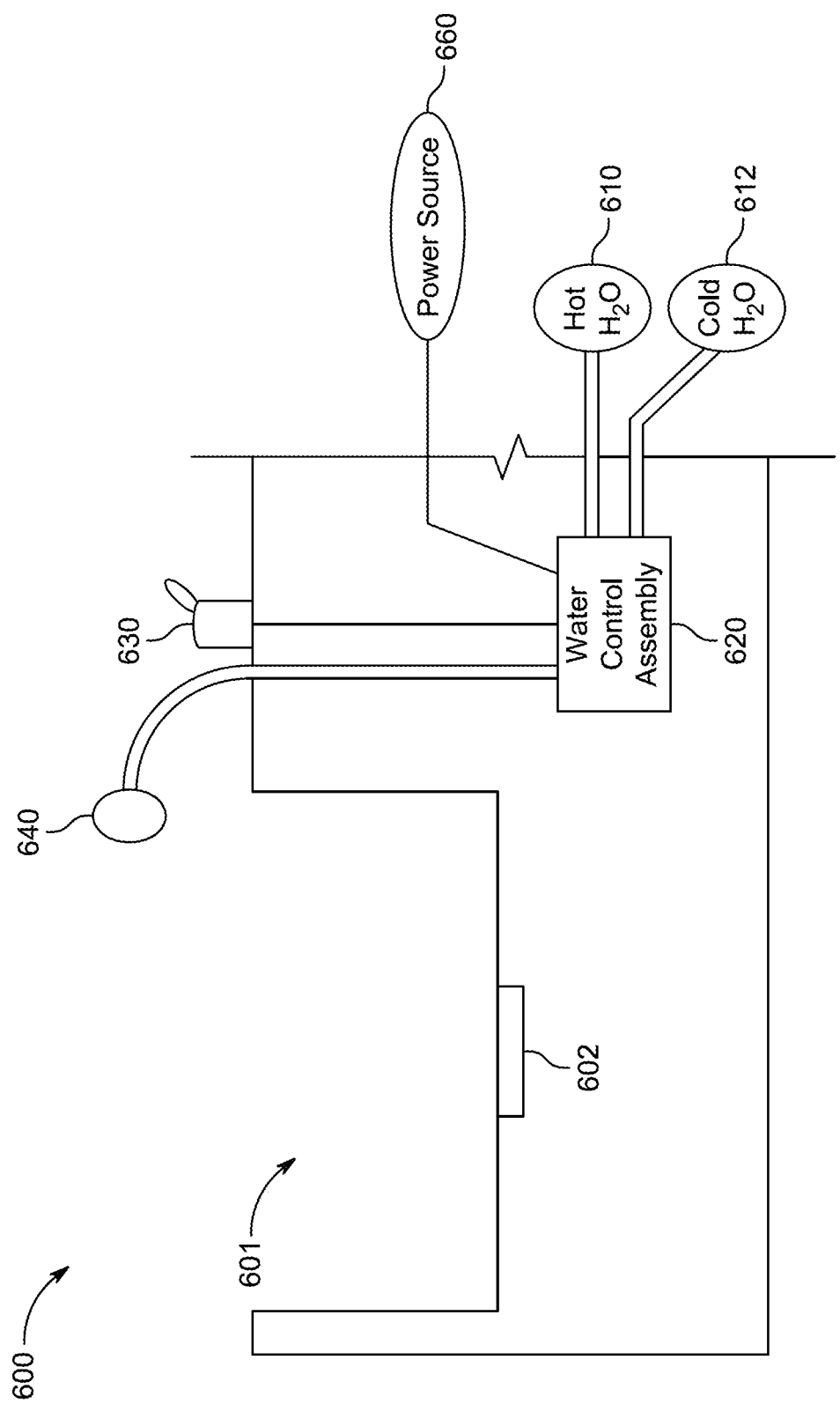
FIG. 6 shows an illustrative schematic of a faucet that uses a water temperature control assembly and a smart water apparatus, according to some embodiments.

FIG. 6 shows an illustrative schematic of a faucet 600 that uses water temperature control assembly 620 and smart water apparatus 640 according to an embodiment. Sink 601 is shown with drain 602, smart water apparatus 640, and water control mechanism 630 located within view of a user. Hot and cold water sources 610 and 612, water temperature control assembly 620, and power source 660 are located out of view of a user (e.g., in a cabinet). Smart water apparatus 640 may embody the elements of apparatus 400 (discussed above) and water temperature control assembly 620 may embody elements of control assembly 300 of FIG. 3 (discussed above). A user may start the faucet by interacting with mechanism 630 (e.g., by turning a dial or pressing a button) or by placing his or her hands or an object in sink 601. Smart water apparatus 640 can control operation of faucet according to various embodiments discussed herein. For example, apparatus 640 may exercise control by instructing assembly 620 to adjust water temperature and/or flow rate. Apparatus 640, itself, may control rate via its own flow valve (e.g., flow valve 420). In addition, apparatus 640 may provide information to the user in the form of a display, light, and/or messages played back through a speaker.

FIGS. 7A and 7B show illustrative front and side views of smart water apparatus 700 according to embodiment. Apparatus 700 can include housing 710, which can be connected to an articulation structure 750 that permits housing 710 to be oriented in a desired direction. Water egress port 720, light ring 730, and display 740 may be integrated into housing 710 as shown. Water egress port 720 may include holes 722 that permit water flow out of housing 710. It should be appreciated that any suitable number and size of holes 722 may be used. In some embodiments, apparatus 700 may be able to selectively close a subset of holes 722 to achieve any number of desired spray patterns and/or spray intensities. For example, the spray pattern can be adjusted based on the size of the occupant in the shower. Light ring 730 is shown to surround port 720, however, this is merely illustrative. For example, light ring 730 may only partially surround port 720. In another example, multiple light rings 730, one for each color, may exist on body 710. Display 740 may be, for example, a touchscreen display that has several springboards 741 of display information that can be shown. The currently shown springboard in FIG. 7A includes water temperature 744 and duration of water usage timer 746. Other springboards can show volume of water used in the current water event, total water usage within a given period of time (e.g., a week or month), messages (e.g., text messages, name of song being played, etc.), person specific statistics (e.g., average water temperatures, average flow rate, etc.), or any other suitable information. In some embodiments, the display may not be included as part of body 710, but can be mounted on a wall and secured to articulation structure 750.

Figure 8:
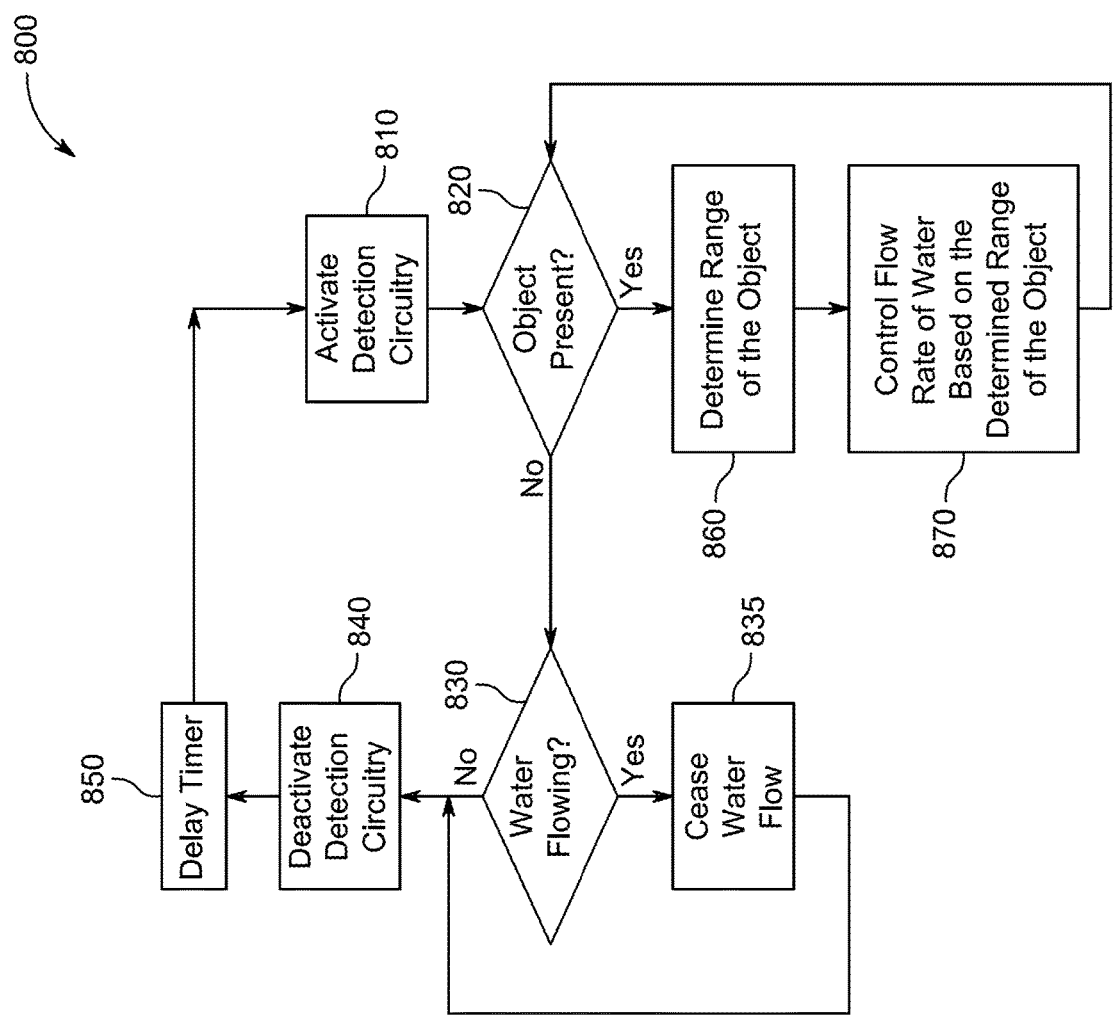
FIG. 8 shows an illustrative process for operating a smart water system based on detected range of at least one object, according to some embodiments.

FIG. 8 shows an illustrative process 800 for operating a smart water system based on detected range of at least one object according to an embodiment. Starting at step 810, detection circuitry can be activated. For example, the detection circuitry may be a radar based detection system that can detect presence and range of object(s) within the vicinity of the smart water system. At step 820, a determination is made as to whether an object is present. If the determination is NO, process 800 determines whether any water is flowing through the water apparatus at step 830. If the determination at step 830 is NO, process 800 deactivates the detection circuitry at step 840 and waits until a delay timer expires (at step 850) before activating the detection circuitry again at step 810. If the determination at step 830 is YES, process 800 can cease flow of water at step 835 and proceed to step 840.

If the determination at step 820 is YES, process 800 proceeds to step 860 to determine a range of the object. At step 870, the flow rate of the water can be controlled based on the determined range of the object. In some embodiments, the flow rate may change based on different range thresholds. For example, if the range of the object is "out of range" or at infinity, the flow rate may be zero. On the opposite end of the range spectrum, when the range of the object is within a minimum range threshold, the flow rate may be set to a maximum flow rate. Different intermediate range thresholds may exist between infinity and the minimum range threshold, and different flow rates can be associated with each intermediate range threshold. Process 800 may return to step 820 to continually adjust the flow rate based on the determined range of the object (while present).

It should be understood that the steps shown in FIG. 8 are merely illustrative and that the order of the steps may be rearranged, steps may be added, or steps may be omitted. For example, the flow rate may be proportional to the ranging distance as opposed to being tied to a threshold based ranging distance.

Figure 9:
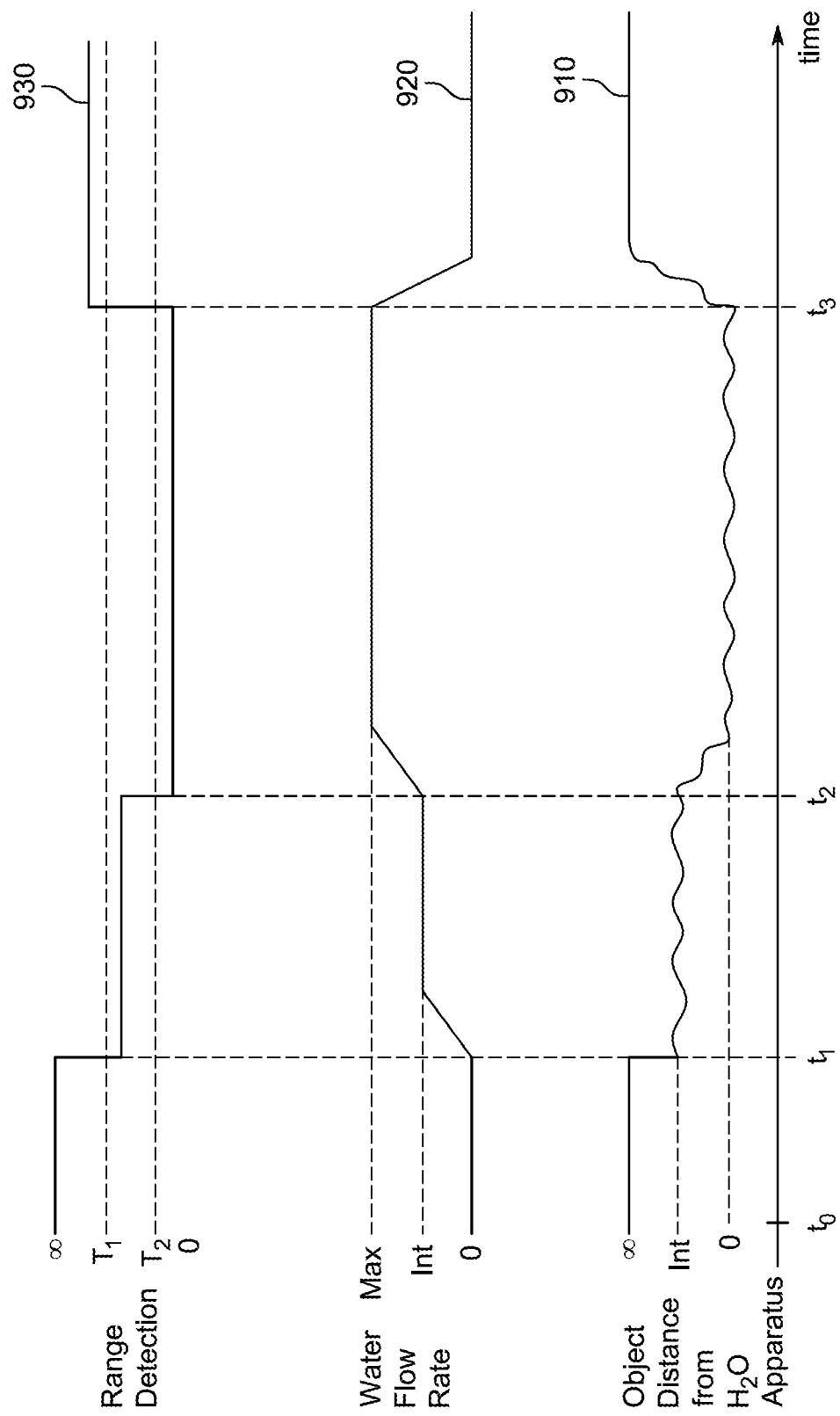
FIG. 9 is an illustrative timing diagram that shows different water flow rates based on range detection of an object, according to some embodiments.

FIG. 9 is an illustrative timing diagram that shows different water flow rates based on range detection of an object according to an embodiment. FIG. 9 includes an object's distance from the water apparatus waveform 910, a water flow rate waveform 920, and range detection waveform 930. At time, $t_0$, the object distance is considered to be at infinity. Consequently, the range detection is also at infinity and the water flow rate is at zero. At time, $t_1$, the object has moved to within an intermediate distance between infinity and a minimum distance (shown as zero). At this intermediate distance, the range detection may exceed threshold, $t_1$, but not exceed threshold, $t_2$. At this ranging threshold, the water flow rate can be set to an intermediate flow rate, as shown in waveform 920. At time, $t_2$, the object has moved to within a minimum distance (shown as zero). At this minimum distance, the range detection may exceed threshold, $t_2$. At this ranging threshold, the water flow rate can be set to a maximum flow rate, as shown in waveform 920. At time, $t_3$, the object has moved out of range to a distance considered as infinity. As a result, range detection also goes to infinity and the water flow rate returns to zero.

Use of RF ranging circuitry such as a radar based ranging systems enable higher order flow rate control based on ranging distance. This is in contrast with other systems that only enable binary flow rate control based on a detected presence of an object. A binary flow rate control has either a zero or max flow rate with nothing in between. The flow rate is zero if nothing is detected, and at max flow rate if something is detected. A higher order flow rate control includes zero and max flow rates and at least one intermediate flow rate between the zero and max flow rates. Radar based systems can also be used to ascertain mass information and unique characteristics information, as discussed below.

Figure 10:
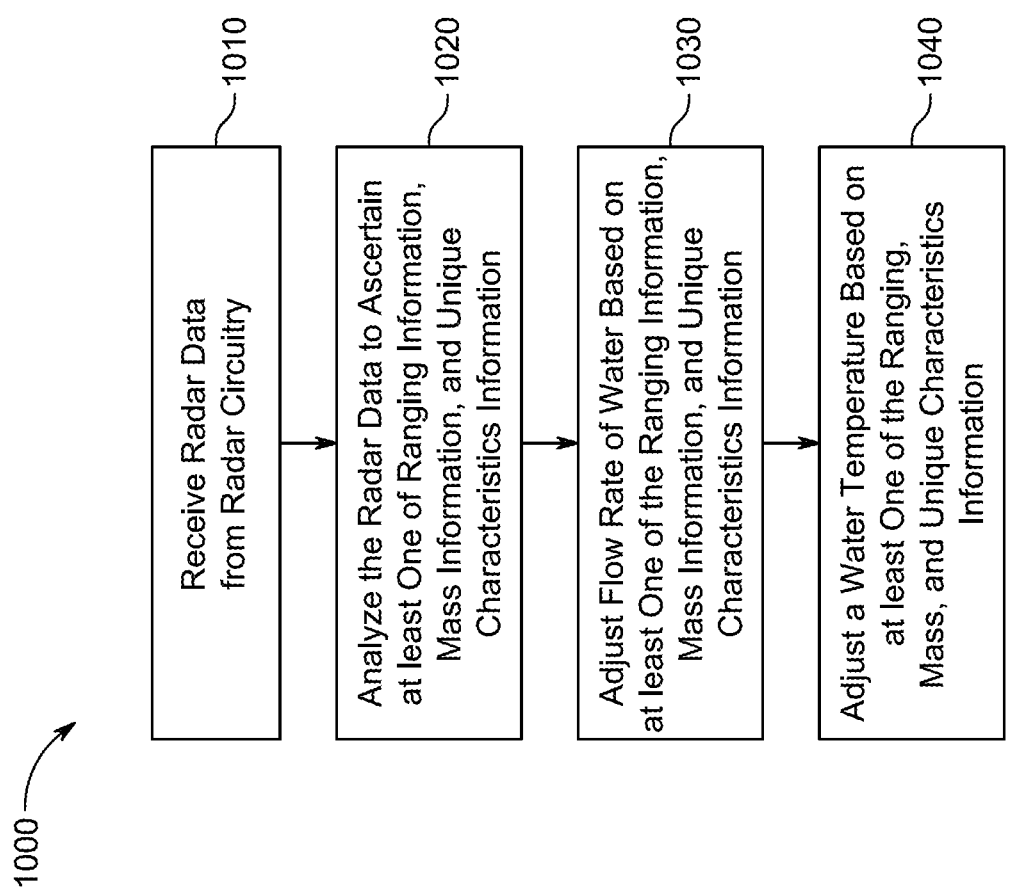
FIG. 10 an illustrative process for operating a smart water system based on ranging, mass, and unique characteristics information, according to some embodiments.

FIG. 10 an illustrative process 1000 for operating a smart water system based on ranging, mass, and unique characteristics information according to an embodiment. Starting at step 1010, radar data is received from radar circuitry. For example, the radar circuitry can be a Doppler radar system or a RF capture system. At step 1020, the radar data can be analyzed to ascertain at least one of ranging information, mass information, and unique characteristics information. For example, control circuitry 440 can process the data determine the ranging information, mass information, and unique characteristics information. It should be understood that some radar system may not be able to directly measure mass, but the mass of an object can be inferred based on distance and Radar Cross Section (RCS) data. The smart water system can determine whether the mass is associated with a first person or a second person based on height and RCS information obtained by the radar system.

At step 1030, the flow rate of the water can be adjusted based on at least one the ranging information, mass information, and unique characteristics information. For example, the flow rate can be controlled by adjusting a flow valve (e.g, flow valve 420) in the water apparatus or adjusting flow controllers (e.g., controllers 310 and 312) in a water temperature control apparatus. At step 1040, a water temperature can be adjusted based on at least one of ranging information, mass information, and unique characteristics information. For example, the water can be controlled by instructing flow controllers (e.g., controllers 310 and 312) in a water temperature control apparatus.

It should be understood that the steps shown in FIG. 10 are merely illustrative and that the order of the steps may be rearranged, steps may be added, or steps may be omitted.

Figure 11:
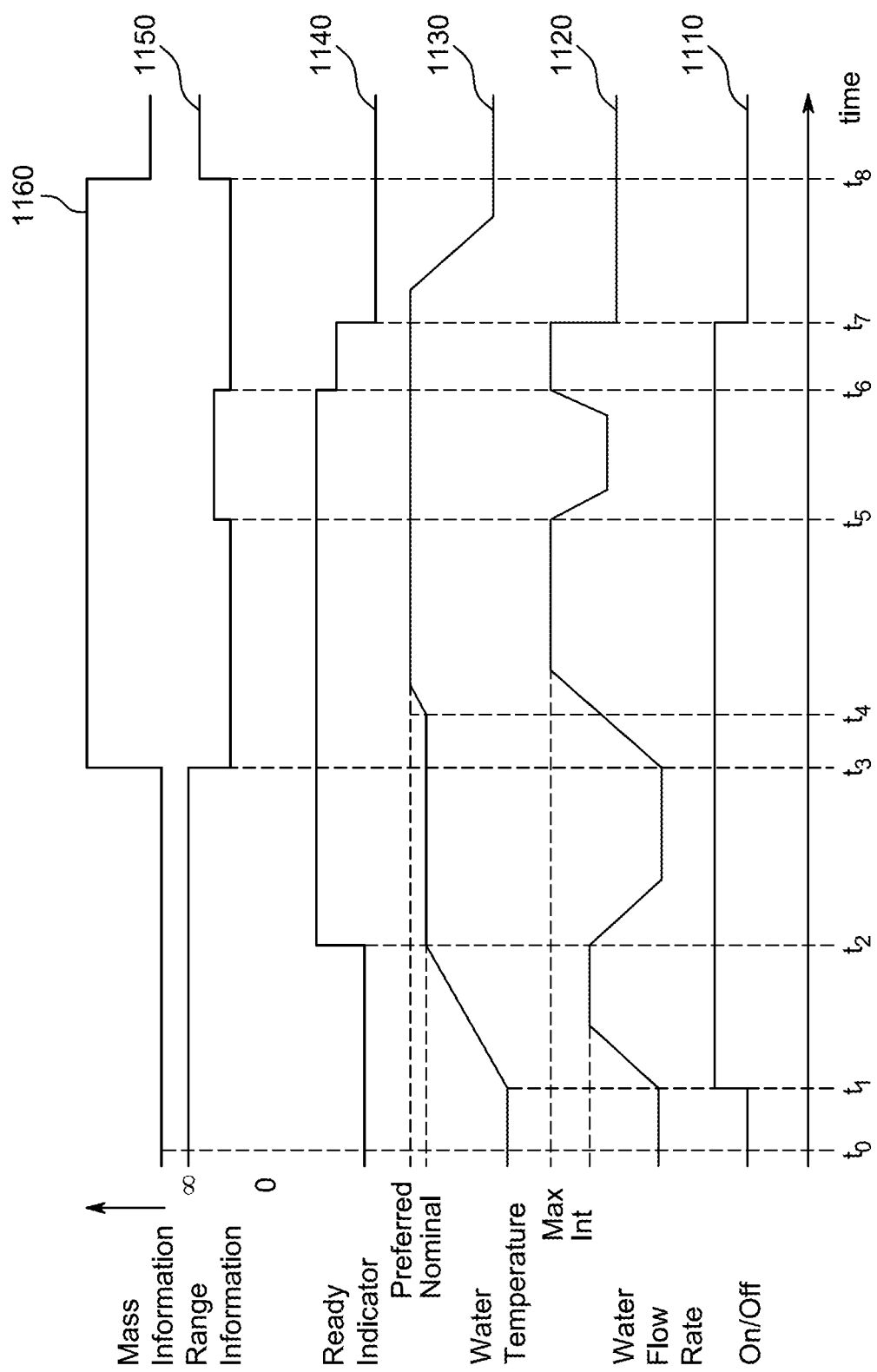
FIG. 11 is an illustrative timing diagram that exemplifies a shower event that utilizes a smart water apparatus according to some embodiments.

FIG. 11 is an illustrative timing diagram that exemplifies a shower event that utilizes a smart water apparatus according to an embodiment. FIG. 11 includes ON/OFF waveform 1110, water flow rate waveform 1120, water temperature waveform 1130, ready indicator waveform 1140, range information waveform 1150, and mass information 1160. ON/OFF waveform 1110 may be triggered by a user activated control mechanism such as control mechanism 230, a control panel such as control panel 250 or a wireless device that communicates with the smart water apparatus. Water flow rate waveform 1120 and water temperature waveform 1130 are self-explanatory. Ready indicator waveform 1140 may correspond to an operational state of a light (e.g., light 458) or display (e.g., display 452) and is being illustrated here to show when the water temperature is ready for the user to step into the shower and as a timer to indicate when the user should end his/her shower. Range information waveform 1150 refers to a ranging distance of an object (e.g., shower occupant) is from a fixed point of reference (e.g., radar array). Mass information waveform 1160 indicates a mass quantity being detected in the shower. The mass quantity may be used to identify the occupant as a child or adult, or in some embodiments, can be used to identify the actual occupant.

At time, $t_0$, each of the waveforms show lack of activity. At time, $t_1$, the user activates the shower, which can cause the water flow rate to increase to an intermediate flow rate. The flow of water causes the water temperature to rise to a nominal water temperature. Once the nominal temperature is reached at time, $t_2$, the flow rate may be turned off and the ready indicator may go high (e.g., light turns green) to indicate to the user that the shower is ready. The flow of water is stopped at time, $t_2$, to conserve water. At time, $t_3$, the occupant enters the shower, as indicated by the increase in mass and change in range detection. Water may begin to flow at time, $t_3$, and increase to the max water flow rate and the water temperature is still being maintained at the nominal temperature. At time, $t_4$, after the control circuitry has had time to identify the mass quantity, the water temperature can be adjusted to a preferred water temperature based on the mass quantity identified in the mass information. At time, $t_5$, the occupant may step back away from the smart water apparatus a bit (e.g., to lather up), and in response to increase ranging distance, the flow rate may be reduced to the intermediate flow (or down to zero). At time, $t_6$, the user steps back closer to the smart water apparatus, the water flow rates is increased back up to the maximum water flow rate. In addition, ready indicator waveform 1140 may change (e.g., to the color orange) to indicate that the shower event should end soon or that hot water tank is miming out of hot water. At time, $t_7$, the user deactivates the shower, which causes the flow rate to drop to zero, and time $t_8$, the user exits the shower.

Figure 12:
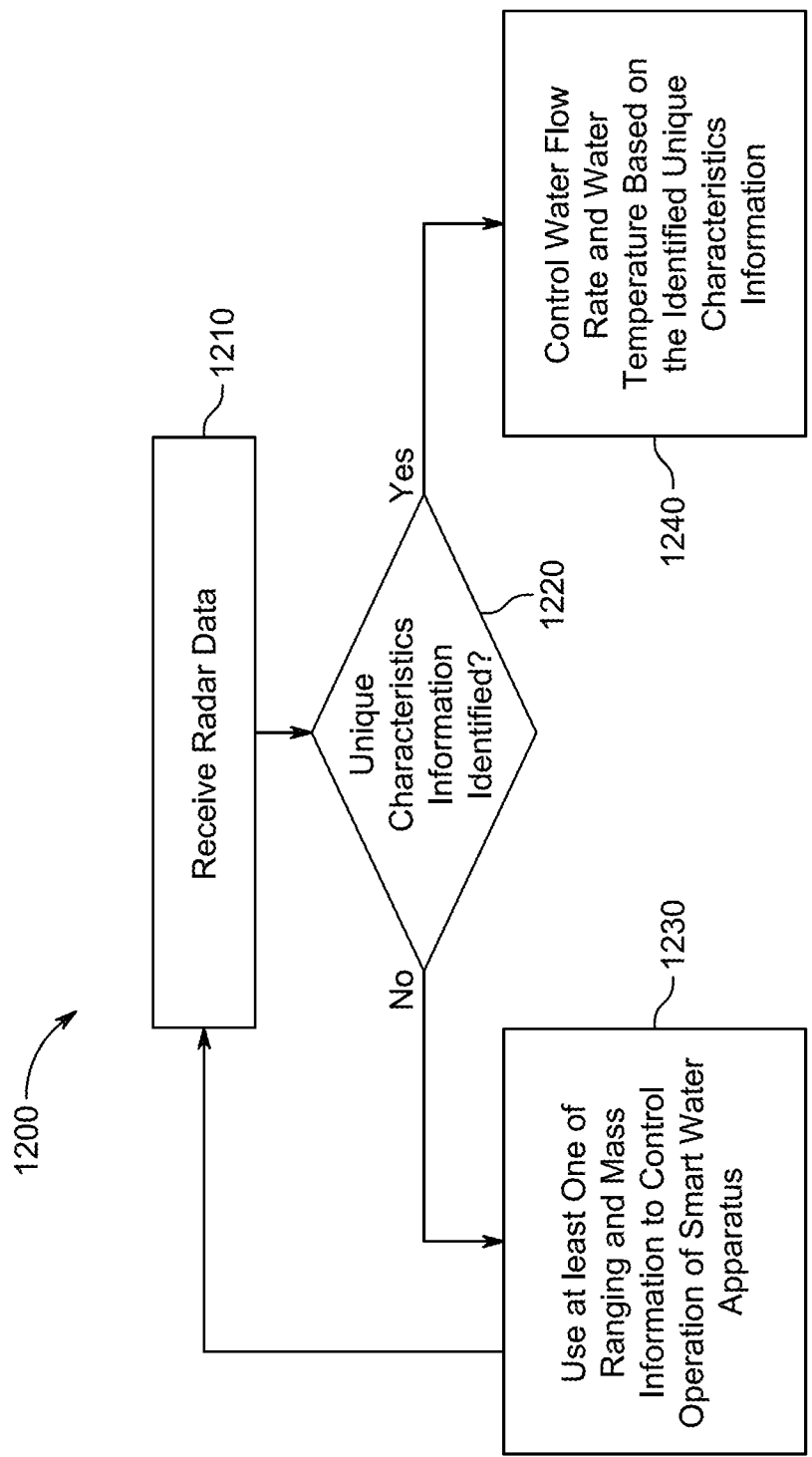
FIG. 12 shows an illustrative process in which the water apparatus controls water usage based on unique characteristics, according to some embodiments.

FIG. 12 shows an illustrative process 1200 in which the water apparatus controls water usage based on unique characteristics according to an embodiment. Process 1200 may start at step 1210, in which radar data is received. At step 1220, a determination is made as to whether unique characteristics information has been identified in the radar data. If the determination is NO, process 1200 may proceed to step 1230 where the smart water apparatus may use at least one of ranging and mass information to control use of the water. If the determination is YES at step 1220, the water apparatus may control water flow rate and water temperature based on the identified unique characteristics information.

In some embodiments, the water apparatus may be used to control the flow of water through a water network that may exist within a structure. For example, when the water apparatus runs water to "heat up the shower," the water entering the drain may be re-routed to a destination other than the sewer or city drain. As a specific example, the drain water can be re-routed to a grey water tank, toilet or garden. When the desired temperature of water is reached (and soap might be added), the water system may cease re-directing the water and force it to flow into the sewer. If desired, the water system can re-direct the drain water based on different values of the drain water. For example, relatively hot and cold water may be directed to a toilet or grey water tank, but hot water may not be directed to a garden. As another embodiment, the smart water system may have knowledge of the storage levels of the alternative water storage vessels. Thus, for example, if the toilet holding tank or grey water system is full, the smart water system can direct the water to other storage tanks or to the sewer.

Figure 13:
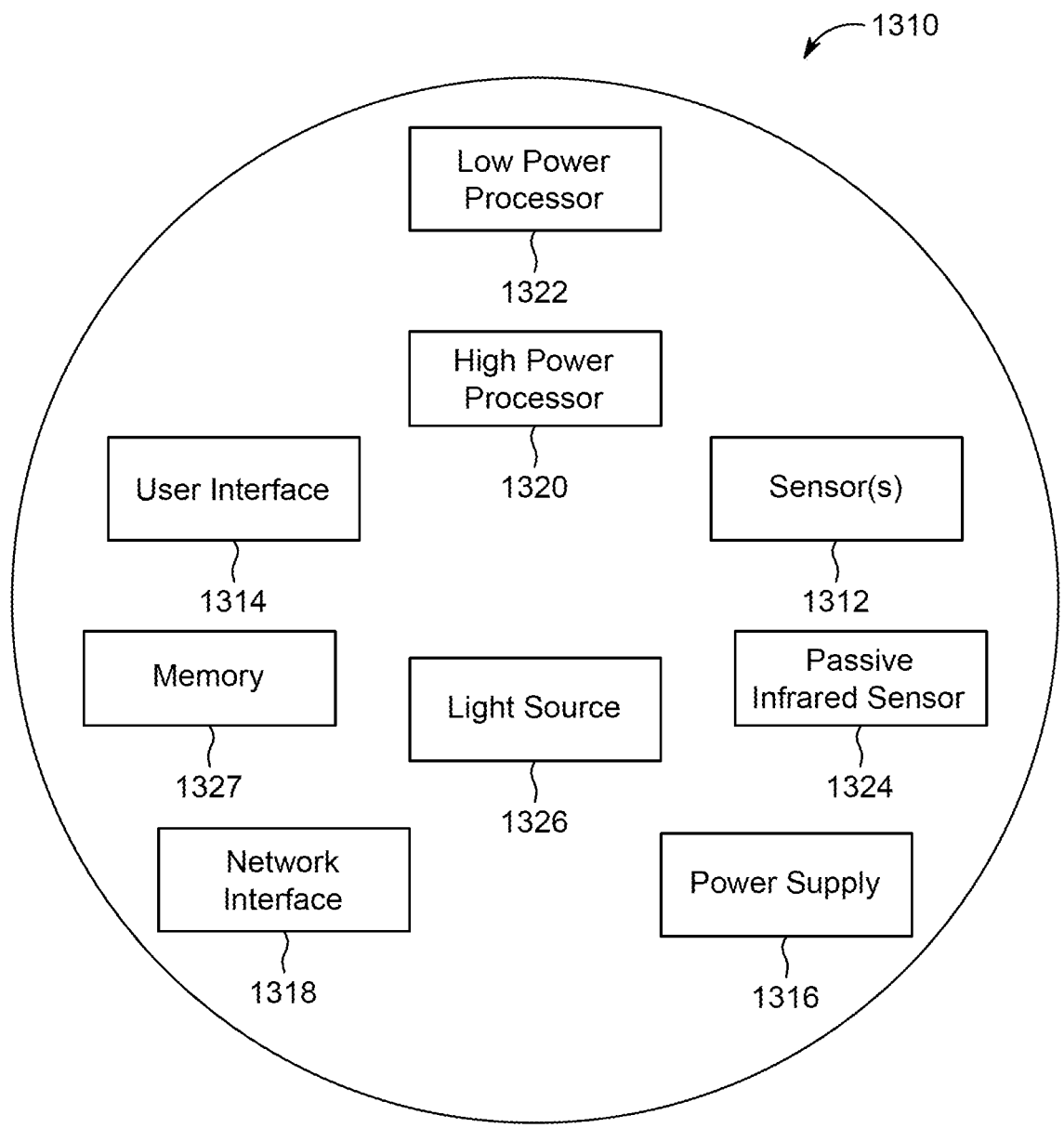
FIG. 13 shows an illustrative example of a general device that may be disposed within a building environment, according to some embodiments.

By way of introduction, FIG. 13 illustrates an example of a general device 1310 that may be disposed within a building environment. In one embodiment, the device 1310 may include one or more sensors 1312, a user-interface component 1314, a power supply 1316 (e.g., including a power connection and/or battery), a network interface 1318, a high-power processor 1320, a low-power processor 1322, a passive infrared (PIR) sensor 1324, a light source 1326, a memory 1327, and the like.

The sensors 1312, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, visual features, textures, optical character recognition (OCR) signals, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), haptic sensors, OCR sensors, or RF identification detector(s). While FIG. 13 illustrates an embodiment with a single sensor, many embodiments may include multiple sensors. In some instances, the device 1310 may include one or more primary sensors and one or more secondary sensors. Here, the primary sensor(s) may sense data central to the core operation of the device (e.g., visual/audio/haptic data about people and/or objects), while the secondary sensor(s) may sense other types of data (e.g., temperature, RF, location (GPS), characters (OCR)), which can be used for privacy-aware personalized content objectives.

One or more user-interface components 1314 in the device 1310 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 1314 or based on a displacement of user-interface components 1314 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 1314 may also include one or more buttons (e.g., up and down buttons), a keypad, a number pad, a switch, a microphone, and/or a camera (e.g., to detect gestures). In one embodiment, the user-interface component 1314 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 1310 may have one primary input component, which may be used to set a plurality of types of settings. The user-interface components 1314 may also be configured to present information to a user via, e.g., a visual display (e.g., a thin-film-transistor display or organic light-emitting-diode display) and/or an audio speaker.

The power-supply component 1316 may include a power connection and/or a local battery. For example, the power connection may connect the device 1310 to a power source such as a line voltage source. In some instances, an AC power source can be used to repeatedly charge a (e.g., rechargeable) local battery, such that the battery may be used later to supply power to the device 1310 when the AC power source is not available.

The network interface 1318 may include a component that enables the device 1310 to communicate between devices. As such, the network interface 1318 may enable the device 1310 to communicate with other devices 1310 via a wired or wireless network. The network interface 1318 may include a wireless card or some other transceiver connection to facilitate this communication. In some embodiments, the network interface 1318 may enable communicating over a private network, public network, or some combination thereof.

The high-power processor 1320 and the low-power processor 1322 may support one or more of a variety of different device functionalities. As such, the high-power processor 1320 and the low-power processor 1322 may each include one or more processors configured and programmed to carry out and/or cause to be carried out one or more of the functionalities described herein. In one embodiment, the high-power processor 1320 and the low-power processor 1322 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain embodiments, the high-power processor 1320 may execute computationally intensive operations such as operating the user-interface component 1314 and the like. The low-power processor 1322, on the other hand, may manage less complex processes such as detecting a hazard or temperature from the sensor 1312. In one embodiment, the low-power processor may wake or initialize the high-power processor for computationally intensive processes.

By way of example, the high-power processor 1320 and the low-power processor 1322 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 1320 and the low-power processor 1322 may include image recognition technology to identify particular occupants or objects.

In certain embodiments, the high-power processor 1320 and the low-power processor 1322 may detect the presence of a human using the PIR sensor 1324. The PIR sensor 1324 may be a passive infrared sensor that may measures infrared (IR) light radiating from objects in its field of view. As such, the PIR sensor 1324 may detect the Infrared radiation emitted from an object.

In some instances, the high-power processor 1320 may predict desirable settings and/or implement those settings. For example, based on the presence detection, the high-power processor 1320 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 1320 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 1318, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying). In another embodiment, a first device may detect certain features of a person and/or object and transmit the feature data to a second device that selects content to display based at least partly on the features.

In addition to detecting various types of events, the device 1310 may include a light source 1326 that may illuminate when a living being, such as a human, is detected as approaching. The light source 1326 may include any type of light source such as one or more light-emitting diodes or the like. The light source 1326 may be communicatively coupled to the high-power processor 1320 and the low-power processor 1322, which may provide a signal to cause the light source 1326 to illuminate.

The memory 1327 may be any suitable article of manufacture that can serve as media to store processor-executable code, data, or the like. These articles of manufacture may represent tangible, non-transitory, computer-readable media (e.g., any suitable form of memory or storage) that may store the processor-executable code used by the high-power processor 1320 and the low-power processor 1322 to perform the presently disclosed techniques. The memory 1327 may also be used to store received communication data from devices 1310 in order to perform the privacy-aware personalized content for a smart-device environment discussed in detail below. Also, the memory 1327 may store sets of content received from a server external to the private network to perform the features disclosed herein.

Figure 14:
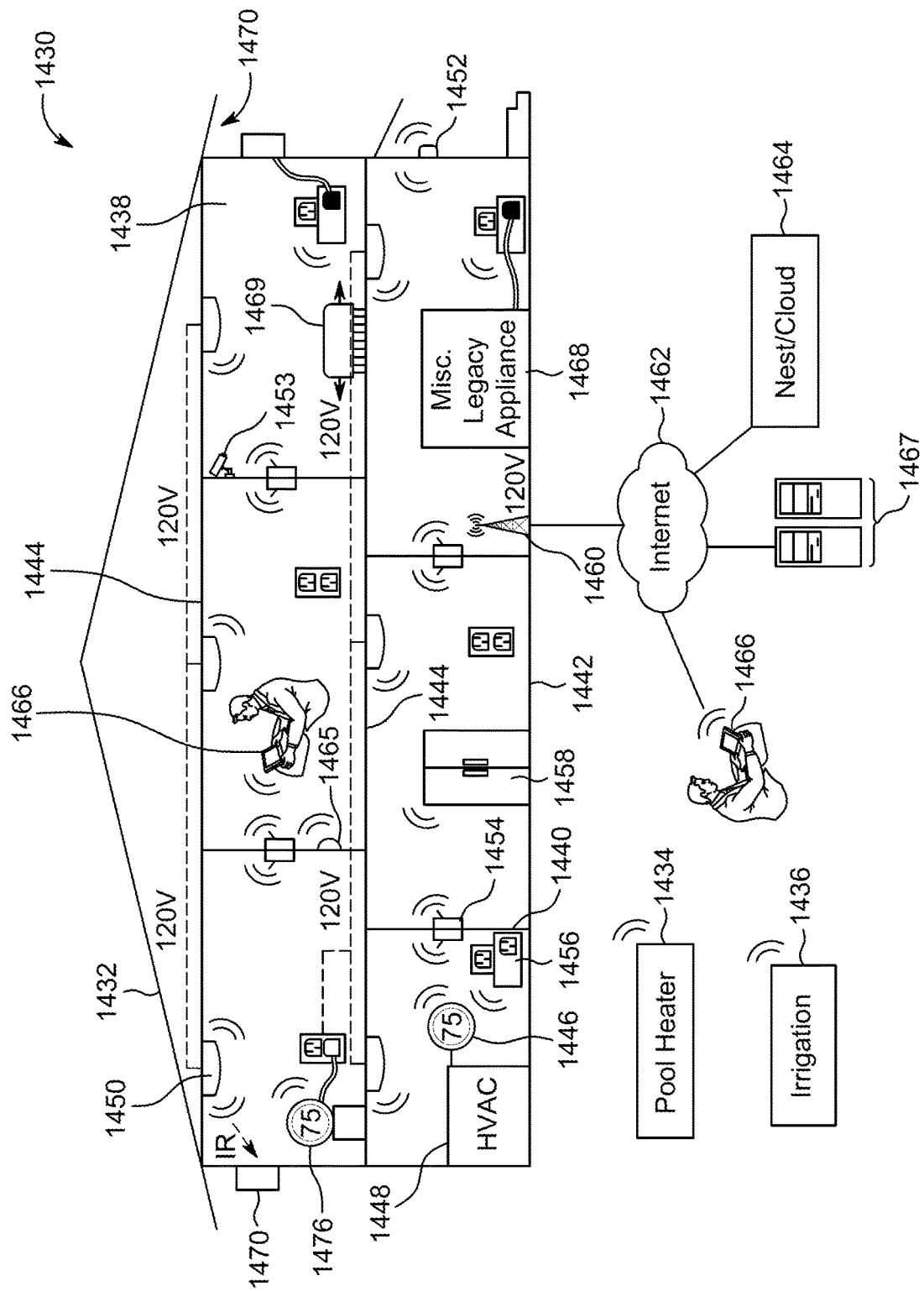
FIG. 14 illustrates an example of a smart-device environment, according to some embodiments.

Keeping the foregoing in mind, FIG. 14 illustrates an example of a smart-device environment 1430 within which one or more of the devices 1310 of FIG. 13, methods, systems, services, and/or computer program products described further herein can be applicable. The depicted smart-device environment 1430 includes a structure 1432, which can include, e.g., a house, office building, garage, or mobile home. It will be appreciated that devices can also be integrated into a smart-device environment 1430 that does not include an entire structure 1432, such as an apartment, condominium, or office space. Further, the smart home environment can control and/or be coupled to devices outside of the actual structure 1432. Indeed, several devices in the smart home environment need not physically be within the structure 1432 at all. For example, a device controlling a pool heater or irrigation system can be located outside of the structure 1432.

The depicted structure 1432 includes a plurality of rooms 1438, separated at least partly from each other via walls 1440. The walls 1440 can include interior walls or exterior walls. Each room can further include a floor 1442 and a ceiling 1444. Devices can be mounted on, integrated with and/or supported by a wall 1440, floor 1442 or ceiling 1444.

In some embodiments, the smart-device environment 1430 of FIG. 14 includes a plurality of devices 1410, including intelligent, multi-sensing, network-connected devices, that can integrate seamlessly with each other and/or with a central server or a cloud-computing system to provide any of a variety of useful smart-home objectives. The smart-device environment 1430 may include one or more intelligent, multi-sensing, network-connected thermostats 1446 (hereinafter referred to as "smart thermostats 1446"), one or more intelligent, network-connected, multi-sensing hazard detection units 1450 (hereinafter referred to as "smart hazard detectors 1450"), one or more intelligent, multi-sensing, network-connected entryway interface devices 1452 (hereinafter referred to as "smart doorbells 1452"), and one or more intelligent, multi-sensing, network-connected video cameras 1453 (hereinafter referred to as "smart video cameras 1453"). According to embodiments, the smart thermostat 1446 may include a Nest® Learning Thermostat—1st Generation T100577 or Nest® Learning Thermostat—2nd Generation T200577 by Nest Labs, Inc., among others. The smart thermostat 1446 detects ambient climate characteristics (e.g., temperature and/or humidity) and controls a HVAC system 1448 accordingly.

The smart hazard detector 1450 may detect the presence of a hazardous substance or a substance indicative of a hazardous substance (e.g., smoke, fire, or carbon monoxide). The smart hazard detector 1450 may include a Nest® Protect that may include sensors 1412 such as smoke sensors, carbon monoxide sensors, and the like. As such, the hazard detector 1450 may determine when smoke, fire, or carbon monoxide may be present within the building.

The smart doorbell 1452 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 1452 may interact with other devices 1410 based on whether someone has approached or entered the smart-device environment 1430.

The smart video camera 1453 may be located inside or outside of the structure 1432, as depicted. The smart video camera 1453 may be wireless (e.g., Wifi) and/or wired and configured to communicate with one or more devices 1410 in the smart home environment 1430. Also, the smart video camera 1453 may be configured to buffer video and record and send video to user devices 1466 via the Internet 1462 and/or a central server or cloud-computing system 1464. Additionally, a software application may be installed on user devices 1466 that is configured to access a live feed of the smart video camera 1453 so that a user may view current footage. The smart video camera 1453 may include a microphone and a speaker in order to enable two-way talk between the smart video camera 1453 and a user of the application. Further, the smart video camera 1453 may be battery-powered or hard-wired and include infrared LEDs that enable night-vision. In addition, the smart video camera 1453 may be configured to provide alerts to a subscribed or interested user of newly recorded available footage (e.g., configurable detected activities). For example, an outdoor smart video camera 1453 may communicate with the smart doorbell 1452 so that any time the smart doorbell 1452 is rung and the user is not home, the smart video camera 1453 may send the video data a configurable amount of time before the smart doorbell 1452 was rung and a configurable amount of time after the smart doorbell 1452 was rung to the user. In this way, the user may determine who visited the home while they are away.

In some embodiments, the smart-device environment 1430 further includes one or more intelligent, multi-sensing, network-connected wall switches 1454 (hereinafter referred to as "smart wall switches 1454"), along with one or more intelligent, multi-sensing, network-connected wall plug interfaces 1456 (hereinafter referred to as "smart wall plugs 1456"). The smart wall switches 1454 may detect ambient lighting conditions, detect room-occupancy states, and control a power and/or dim state of one or more lights. In some instances, smart wall switches 1454 may also control a power state or speed of a fan, such as a ceiling fan. The smart wall plugs 1456 may detect occupancy of a room or enclosure and control supply of power to one or more wall plugs (e.g., such that power is not supplied to the plug if nobody is at home).

Still further, in some embodiments, the device 1410 within the smart-device environment 1430 may further include a plurality of intelligent, multi-sensing, network-connected appliances 1458 (hereinafter referred to as "smart appliances 1458"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 1458 are made compatible with the smart-device environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 1468, such as old conventional washer/dryers, refrigerators, and the like which can be controlled, albeit coarsely (ON/OFF), by virtue of the smart wall plugs 1456. The smart-device environment 1430 can further include a variety of partially communicating legacy appliances 1470, such as infrared ("IR") controlled wall air conditioners or other IR-controlled devices, which can be controlled by IR signals provided by the smart hazard detectors 1450 or the smart wall switches 1454.

According to embodiments, the smart thermostats 1446, the smart hazard detectors 1450, the smart doorbells 1452, the smart wall switches 1454, the smart wall plugs 1456, and other devices of the smart-device environment 1430 are modular and can be incorporated into older and new houses. For example, the devices 1410 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 1412, processors 1428, user interfaces 1414, the power supply 1416, the network interface 1418, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-device environment 1430 may also include communication with devices outside of the physical home but within a proximate geographical range of the home. For example, the smart-device environment 1430 may include a pool heater monitor 1434 that communicates a current pool temperature to other devices within the smart-device environment 1430 or receives commands for controlling the pool temperature. Similarly, the smart-device environment 1430 may include an irrigation monitor 1436 that communicates information regarding irrigation systems within the smart-device environment 1430 and/or receives control information for controlling such irrigation systems. According to embodiments, an algorithm is provided for considering the geographic location of the smart-device environment 1430, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 14 can further allow a user to interact with the device even if the user is not proximate to the device. For example, a user can communicate with a device using a computer (e.g., a desktop computer, laptop computer, or tablet) or other portable electronic device (e.g., a smartphone) 1466. A web page or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-device environment 1430 using a network-connected computer or portable electronic device 1466. In some examples, some or all of the occupants (e.g., individuals who live in the home) can register their device 1466 with the smart-device environment 1430. Such registration can be made at a central server to authenticate the occupant and/or the device as being associated with the home and to give permission to the occupant to use the device to control the smart devices in the home. An occupant can use their registered device 1466 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 1466, the smart-device environment 1430 makes inferences about which individuals live in the home and are therefore occupants and which devices 1466 are associated with those individuals. As such, the smart-device environment "learns" who is an occupant and permits the devices 1466 associated with those individuals to control the smart devices of the home.

In some embodiments, the smart-device environment 1430 may be in communication with one or more servers 1467 that supply content to a device 1410 (e.g., portable electronic device 1466, TV, computer) within a private network utilized amongst devices 1410 within the environment 1430. The devices 1410 that receive the content from the servers 1467 may select at least a piece of the content to display based on people and/or object data obtained via sensors or received from another device 1410 within the environment 1430, a score assigned by the server to each piece of content, or both.

In some instances, guests desire to control the smart devices. For example, the smart-device environment may receive communication from an unregistered mobile device of an individual inside of the home, where said individual is not recognized as an occupant of the home. Further, for example, a smart-device environment may receive communication from a mobile device of an individual who is known to be or who is registered as a guest.

According to embodiments, a guest-layer of controls can be provided to guests of the smart-device environment 1430. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the present disclosure, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 1466.

For example, the smart device, such as the smart thermostat, may be equipped with walkup-identification technology (e.g., facial recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 1446 and other smart devices "learn" by observing occupant behavior. For example, the smart thermostat learns occupants' preferred temperature setpoints for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe. In other embodiments, the detection circuitry can detect whether the water is going to overflow in a tub or sink and automatically shutoff flow of water. In yet another embodiment, the smart water apparatus can automatically drain a tub when it senses that the occupant is no longer present or it may drain the tub based on user input (e.g., a spoken command to a central house control system or by pressing a button on a control panel).

In some embodiments, in addition to containing processing and sensing capabilities, each of the devices 1434, 1436, 1446, 1450, 1452, 1454, 1456, and 1458 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 1460. The smart devices can further communicate with each other via a connection to a network, such as the Internet 1462, or a private network. Through the Internet 1462, the smart devices can communicate with a central server or a cloud-computing system 1464. The central server or cloud-computing system 1464 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 1464 to devices (e.g., when available, when purchased, or at routine intervals).

According to embodiments, the smart devices combine to create a mesh network of spokesman and low-power nodes in the smart-device environment 1430, where some of the smart devices are "spokesman" nodes and others are "low-powered" nodes. Some of the smart devices in the smart-device environment 1430 are battery powered, while others have a regular and reliable power source, such as by connecting to wiring (e.g., to 120V line voltage wires) behind the walls 1440 of the smart-device environment. The smart devices that have a regular and reliable power source are referred to as "spokesman" nodes. These nodes are equipped with the capability of using any wireless protocol or manner to facilitate bidirectional communication with any of a variety of other devices in the smart-device environment 1430 as well as with the central server or cloud-computing system 1464. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-device environment 1430, such as the spokesman nodes, cannot send information to these low-power nodes.

As described, the smart devices serve as low-power and spokesman nodes to create a mesh network in the smart-device environment 1430. Individual low-power nodes in the smart-device environment regularly send out messages regarding what they are sensing, and the other low-powered nodes in the smart-device environment—in addition to sending out their own messages—repeat the messages, thereby causing the messages to travel from node to node (i.e., device to device) throughout the smart-device environment 1430. The spokesman nodes in the smart-device environment 1430 are able to "drop down" to low-powered communication protocols to receive these messages, translate the messages to other communication protocols, and send the translated messages to other spokesman nodes and/or the central server or cloud-computing system 1464. Thus, the low-powered nodes using low-power communication protocols are able send messages across the entire smart-device environment 1430 as well as over the Internet 1462 to the central server or cloud-computing system 1464. According to embodiments, the mesh network enables the central server or cloud-computing system 64 to regularly receive data from all of the smart devices in the home, make inferences based on the data, and send commands back to one of the smart devices to accomplish some of the smart-home objectives described herein. As may be appreciated, the people and/or object data that is obtained via sensing by the devices 1410 and used to select content to display may not be provided to the servers 1467 or the central server or cloud-computing system 1464 according to privacy policies and/or settings.

As described, the spokesman nodes and some of the low-powered nodes are capable of "listening". Accordingly, users, other devices, and the central server or cloud-computing system 1464 can communicate controls to the low-powered nodes. For example, a user can use the portable electronic device (e.g., a smartphone) 1466 to send commands over the Internet 1462 to the central server or cloud-computing system 1464, which then relays the commands to the spokesman nodes in the smart-device environment 1430. The spokesman nodes drop down to a low-power protocol to communicate the commands to the low-power nodes throughout the smart-device environment, as well as to other spokesman nodes that did not receive the commands directly from the central server or cloud-computing system 1464.

An example of a low-power node is a smart nightlight 1465. In addition to housing a light source, the smart nightlight 1465 houses an occupancy sensor, such as an ultrasonic or passive IR sensor, and an ambient light sensor, such as a photoresistor or a single-pixel sensor that measures light in the room. In some embodiments, the smart nightlight 1465 is configured to activate the light source when its ambient light sensor detects that the room is dark and when its occupancy sensor detects that someone is in the room. In other embodiments, the smart nightlight 1465 is simply configured to activate the light source when its ambient light sensor detects that the room is dark. Further, according to embodiments, the smart nightlight 1465 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-device environment 1430 as well as over the Internet 1462 to the central server or cloud-computing system 1464.

Other examples of low-powered nodes include battery-operated versions of the smart hazard detectors 1450. These smart hazard detectors 1450 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 1450 can send messages that correspond to each of the respective sensors to the other devices and the central server or cloud-computing system 1464, such as by using the mesh network as described above.

Examples of spokesman nodes include smart thermostats 1446, smart doorbells 1452, smart wall switches 1454, and smart wall plugs 1456. These devices 1446, 1452, 1454, and 1456 are often located near and connected to a reliable power source, and therefore can include more power-consuming components, such as one or more communication chips capable of bidirectional communication in any variety of protocols.

In some embodiments, these low-powered and spokesman nodes (e.g., devices 1446, 1450, 1452, 1453, 1454, 1456, 1458, 1459, and 1465) can function as "tripwires" for an alarm system in the smart-device environment. For example, in the event a perpetrator circumvents detection by alarm sensors located at windows, doors, and other entry points of the smart-device environment 1430, the alarm could be triggered upon receiving an occupancy, motion, heat, sound, etc. message from one or more of the low-powered and spokesman nodes in the mesh network. For example, upon receiving a message from a smart nightlight 1465 indicating the presence of a person, the central server or cloud-computing system 1464 or some other device could trigger an alarm, provided the alarm is armed at the time of detection. Also, if the smart video camera 1453 detects movement inside or around the house, the central server or cloud-computing system 1464 or some other device could trigger an alarm. Thus, the alarm system could be enhanced by various low-powered and spokesman nodes located throughout the smart-device environment 1430. In this example, a user could enhance the security of the smart-device environment 1430 by buying and installing extra smart nightlights 1465.

In some embodiments, the mesh network can be used to automatically turn on and off lights as a person transitions from room to room. For example, the low-powered and spokesman nodes detect the person's movement through the smart-device environment and communicate corresponding messages through the mesh network. Using the messages that indicate which rooms are occupied, the central server or cloud-computing system 1464 or some other device activates and deactivates the smart wall switches 1454 to automatically provide light as the person moves from room to room in the smart-device environment 1430. Further, users may provide pre-configuration information that indicates which smart wall plugs 1456 provide power to lamps and other light sources, such as the smart nightlight 1465. Alternatively, this mapping of light sources to smart wall plugs 1456 can be done automatically (e.g., the smart wall plugs 1456 detect when a light source is plugged into it, and it sends a corresponding message to the central server or cloud-computing system 1464). Using this mapping information in combination with messages that indicate which rooms are occupied, the central server or cloud-computing system 1464 or some other device activates and deactivates the smart wall plugs 1456 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-device environment 1430. For example, for each room in the house, the user provides a map of the best exit route. It should be appreciated that instead of a user providing this information, the central server or cloud-computing system 1464 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 1450 detects smoke and activates an alarm), the central server or cloud-computing system 1464 or some other device uses occupancy information obtained from the low-powered and spokesman nodes to determine which rooms are occupied and then turns on lights (e.g., smart nightlights 1465, smart wall switches 1454, smart wall plugs 1456 that power lamps, etc.) along the exit routes from the occupied rooms so as to provide emergency exit lighting.

Further included and illustrated in the smart-device environment 1430 of FIG. 14 are service robots 1469 each configured to carry out, in an autonomous manner, any of a variety of household tasks. For some embodiments, the service robots 1469 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 1469 are configured to perform tasks such as playing music for an occupant, serving as a localized thermostat for an occupant, serving as a localized air monitor/purifier for an occupant, serving as a localized baby monitor, serving as a localized hazard detector for an occupant, serving as a waiter by retrieving items (e.g., food, drinks) to the user, and so forth, it being generally more desirable for such tasks to be carried out in the immediate presence of the human occupant. For purposes of the instant description, such tasks can be considered as "human-facing" or "human-centric" tasks.

Moreover, the processes described with respect to FIGS. 1-14, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

"Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, the various sensing systems shown in FIG. 14 can readily be implemented in conjunction with the shower control system 500 of FIG. 5 to provide particular advantageous scenarios. For example, the various smart-home occupancy and location sensors of FIG. 14 can be used to detect a person walking down a hallway and toward the bathroom during a particular morning hour of a particular day of the week in which it has been observed that the user statistically is likely to take a shower. This knowledge can be used to begin a pre-heating water flow even before the user has entered the bathroom and, if the person does enter the bathroom to take a shower, that much more time in water pre-heating has been saved. By way of further example, using a video camera placed in the hallway just outside the bathroom in combination with facial recognition, the identity of the person entering the bathroom can be determined. Responsive thereto, various presets, offsets, and preferences (e.g., preferred water temperature for that person) can be imputed by the shower control system 500. Once again, because there is no imaging of the person while in the bathroom, privacy is maintained while at the same time the benefits of automated person detection are enjoyed by the user. Therefore, reference to the details of the preferred embodiments is not intended to limit their scope.

What is claimed is:

1. A smart water apparatus, comprising:
   a water source port;
   a water egress port;
   flow control valve operative to control flow of water received at the water source port and ejected through the water egress port;
   power storage;
   power control circuitry electrically coupled to the power storage;
   a water turbine electrically coupled to the power control circuitry and operative to generate power when water is flowing through the smart water apparatus;
   radio frequency (RF) detection circuitry operative to identify a characteristic of an object; and
   control circuitry coupled to the flow control valve and the RF detection circuitry, wherein the control circuitry is operative to:
     adjust a temperature of the water being ejected through the water egress port based on the identified characteristic of the object, wherein:
       the identified characteristic being indicative of a toothbrush causes the temperature to be adjusted to a relatively cold temperature; and
       the identified characteristic being indicative of a razor causes the temperature to be adjusted to a relatively hot temperature.

2. The smart water apparatus of claim 1, wherein the control circuitry is further operative to adjust a flow of water being ejected through the water egress port, wherein the flow of water ranges from a zero flow rate to a maximum flow rate, and the flow control valve adjust the flow to at least one intermediate flow rate existing between the zero and maximum flow rates based on an approximated distance between the object and the smart water apparatus.

3. The smart water apparatus of claim 1, further comprising:
 a light emitting diode (LED) array positioned adjacent to the water egress port and is electrically connected to the control circuitry.

4. The smart water apparatus of claim 3, wherein the control circuitry is operative to vary a color output of the LED array based on a temperature of the water flowing through the smart water apparatus.

5. The smart water apparatus of claim 3, wherein the control circuitry is operative to control color output of the LED array according to a time of water usage during a shower event.

6. The smart water apparatus of claim 1, further comprising:
 memory; and
 wireless communications circuitry operative to wirelessly communicate with a remote server, wherein the control circuitry is operative to update software stored in the memory by accessing the remote server.

7. The smart water apparatus of claim 1, wherein the RF detection circuitry comprises radar.

8. A smart water apparatus, comprising:
 a water source port;
 a water egress port;
 flow control valve operative to control a flow of water received at the water source port and ejected through the water egress port;
 a temperature sensor operative to monitor a water temperature of water flowing through the smart water apparatus;
 communications circuitry operative to communicate with remote circuitry that is coupled to a water temperature control assembly;
 radio frequency (RF) capturing circuitry operative to detect and characterize an object; and
 control circuitry coupled to the temperature sensor, the communications circuitry, the flow control valve, and the RF capturing circuitry, wherein the control circuitry is operative to:
  adjust the flow of water, via the flow control valve, being ejected through the water egress port; and
  adjust the temperature of the water, via the communications circuitry, based on characterizing the object, wherein:
   the object being characterized as a toothbrush causes the temperature to be adjusted to a relatively cold temperature; and
   the object being characterized as a razor causes the temperature to be adjusted to a relatively hot temperature.

9. The smart water apparatus of claim 8, wherein the flow of water ranges from a zero flow rate to a maximum flow rate, and the flow control valve adjusts the flow to at least one intermediate flow rate existing between the zero and maximum flow rates based on an approximated distance between the object and the smart water apparatus and the object.

10. The smart water apparatus of claim 9, wherein when the object is classified as a first mass quantity, the control circuitry is operative to instruct the flow control valve to adjust the flow to the at least one intermediate flow rate, and wherein when the object is classified as a second mass quantity, the control circuitry is operative to instruct the flow control valve to adjust the flow to the maximum flow rate, wherein the second mass quantity is greater than the first mass quantity.

11. The smart water apparatus of claim 8, wherein the control circuitry is operative to classify the object as one of a child and an adult, and wherein the water temperature is adjusted to a first water temperature when the object is classified as the child and wherein the water temperature is adjusted to a second water temperature when the object is classified as the adult.

12. A smart water apparatus, comprising:
 a water source port;
 a water egress port;
 flow control valve operative to control a flow of water received at the water source port and ejected through the water egress port;
 a temperature sensor operative to monitor a water temperature of water flowing through the smart water apparatus;
 communications circuitry operative to communicate with remote circuitry that is coupled to a water temperature control assembly;
 radio frequency (RF) capturing circuitry operative to identify a characteristic of an object; and
 control circuitry coupled to the temperature sensor, the communications circuitry, the flow control valve, and the RF capturing circuitry, wherein the control circuitry is operative to:
  adjust the flow of water, via the flow control valve, being ejected through the water egress port; and
  adjust the temperature of the water based on the identified characteristic of the object, wherein:
   the identified characteristic being indicative of a toothbrush causes the temperature to be adjusted to a relatively cold temperature; and
   the identified characteristic being indicative of a razor causes the temperature to be adjusted to a relatively hot temperature.

13. A method for operating a smart water apparatus, comprising:
 using radio frequency (RF) capturing circuitry to:
  approximate a distance of an object from a fixed point of reference and characterize the object; and
 adjusting a water temperature based on the object being characterized, wherein:
  the object being characterized as a toothbrush causes the temperature to be adjusted to a relatively cold temperature; and
  the object being characterized as a razor causes the temperature to be adjusted to a relatively hot temperature;
 adjusting a flow rate of water exiting the smart water apparatus based on the approximated distance, wherein the flow rate comprises a zero flow rate, a maximum flow rate, and at least one intermediate flow rates existing between the zero and maximum flow rates, wherein the adjusting comprises:
  in response to initiation of a hot water event and no object is detected, setting the flow rate to a first intermediate flow rate of the at least one intermediate flow rates to enable the water temperature to reach a first temperature; and
  in response to determination that the water temperature reached the first temperature:
   setting the flow rate to the zero flow rate or to a second intermediate flow rate that is less than the first intermediate flow rate; and
   indicating that the water has reached the first temperature.

14. The method of claim 13, further comprising:
using the radio frequency (RF) capturing circuitry to approximate a mass of the object; and
wherein said adjusting the flow rate comprises adjusting the flow rate of water exiting the smart water apparatus based on the approximated distance and mass of the object.

15. The method of claim 14, further comprising:
adjusting the water temperature of the water exiting the smart water apparatus based on the approximated distance and mass of the object.

16. A smart water apparatus, comprising:
a water source port;
a water egress port;
flow control valve operative to control flow of water received at the water source port and ejected through the water egress port;
radio frequency (RF) detection circuitry operative to identify a characteristic of an object; and
control circuitry coupled to the flow control valve and the RF detection circuitry, wherein the control circuitry is operative to:
adjust a temperature of the water being ejected through the water egress port based on the identified characteristic of the object, wherein:
the identified characteristic being indicative of a first type of inanimate object for which the temperature of the water is adjusted to a first temperature; and
the identified characteristic being indicative of a second type of inanimate object for which the temperature of the water is adjusted to a second temperature.

17. The smart water apparatus of claim 16, wherein:
the control circuitry is further operative to adjust a flow of water being ejected through the water egress port; and
the flow of water ranges from a zero flow rate to a maximum flow rate, and the flow control valve adjust the flow to at least one intermediate flow rate existing between the zero and maximum flow rates based on an approximated distance between the object and the smart water apparatus.

18. The smart water apparatus of claim 16, further comprising:
a light emitting diode (LED) array positioned adjacent to the water egress port and is electrically connected to the control circuitry, wherein:
the control circuitry is operative to vary a color output of the LED array based on a temperature of the water flowing through the smart water apparatus.

19. The smart water apparatus of claim 16, further comprising power control circuitry.

20. The smart water apparatus of claim 19, further comprising:
a water turbine electrically coupled to the power control circuitry and operative to generate power when water is flowing through the smart water apparatus.

* * * * *